(12) United States Patent
Mensink et al.

(10) Patent No.: US 8,774,515 B2
(45) Date of Patent: Jul. 8, 2014

(54) LEARNING STRUCTURED PREDICTION MODELS FOR INTERACTIVE IMAGE LABELING

(75) Inventors: Thomas Mensink, Grenoble (FR); Jakob Verbeek, Grenoble (FR); Gabriela Csurka, Crolles (FR)

(73) Assignee: Xerox Corporation, Norwalk, CT (US)

( * ) Notice: Subject to any disclaimer, the term of this patent is extended or adjusted under 35 U.S.C. 154(b) by 443 days.

(21) Appl. No.: 13/090,378

(22) Filed: Apr. 20, 2011

(65) Prior Publication Data

US 2012/0269436 A1     Oct. 25, 2012

(51) Int. Cl.
*G06K 9/34* (2006.01)
(52) U.S. Cl.
USPC ........... 382/180; 382/128; 382/224; 382/159; 382/181
(58) Field of Classification Search
USPC ......... 382/180, 159, 224, 181, 154, 131, 228; 715/233, 234, 229, 230; 704/4, 3, 5, 6, 704/9
See application file for complete search history.

(56) References Cited

U.S. PATENT DOCUMENTS

| | | | |
|---|---|---|---|
| 6,789,109 B2 | 9/2004 | Samra et al. | |
| 7,139,754 B2 | 11/2006 | Goutte et al. | |
| 7,225,200 B2 * | 5/2007 | Chickering et al. | ........... 1/1 |
| 7,577,901 B1 | 8/2009 | Hull et al. | |
| 7,627,556 B2 | 12/2009 | Liu et al. | |
| 7,630,525 B2 * | 12/2009 | Sabe et al. | ........... 382/118 |
| 7,636,883 B2 | 12/2009 | Albornoz et al. | |
| 7,912,288 B2 * | 3/2011 | Winn et al. | ........... 382/181 |
| 7,974,934 B2 * | 7/2011 | Ravikumar et al. | ........... 706/12 |
| 2007/0005356 A1 | 1/2007 | Perronnin | |
| 2007/0150801 A1 | 6/2007 | Chidlovskii et al. | |
| 2007/0258648 A1 | 11/2007 | Perronnin | |
| 2008/0069456 A1 | 3/2008 | Perronnin | |
| 2008/0075367 A1 * | 3/2008 | Winn et al. | ........... 382/180 |
| 2008/0317358 A1 | 12/2008 | Bressan et al. | |
| 2009/0144033 A1 | 6/2009 | Liu et al. | |
| 2009/0175533 A1 * | 7/2009 | Sabe et al. | ........... 382/159 |
| 2009/0252404 A1 | 10/2009 | Lecerf | |
| 2010/0040285 A1 | 2/2010 | Csurka et al. | |
| 2010/0092084 A1 | 4/2010 | Perronnin et al. | |
| 2010/0098343 A1 | 4/2010 | Perronnin et al. | |
| 2010/0318477 A1 | 12/2010 | Perronnin et al. | |
| 2011/0026831 A1 | 2/2011 | Perronnin et al. | |

(Continued)

OTHER PUBLICATIONS

Zhang, et al., "Local features and kernels for classification of texture and object categories: a comprehensive study," IJCV, 73(2):213-238, 2007.

(Continued)

*Primary Examiner* — Mekonen Bekele
(74) *Attorney, Agent, or Firm* — Fay Sharpe LLP

(57) ABSTRACT

A system and a method are provided for labeling images and for generating an annotation system. The labeling method includes providing a graphical structure, such as a tree structure, which graphically represents predictive correlations between labels in a set of labels. The predictive correlations can, for example, estimate the likelihood, in a training set, that knowing one label has a given value, another label will have a given value. An image to be labeled is received. Feature-based predictions for values of labels in the set of labels are computed for the image. A value for at least one label for the image from the set of labels is computed based on the feature-based label predictions and inference on the structured prediction model.

27 Claims, 12 Drawing Sheets

(56) References Cited

U.S. PATENT DOCUMENTS

| | | | |
|---|---|---|---|
| 2011/0052063 A1* | 3/2011 | McAuley et al. | 382/180 |
| 2011/0184950 A1 | 7/2011 | Skaff et al. | |
| 2012/0082371 A1* | 4/2012 | Bengio et al. | 382/159 |
| 2012/0143853 A1 | 6/2012 | Gordo et al. | |

OTHER PUBLICATIONS

Guillaumin, et al., "Tagprop: Discriminative metric learning in nearest neighbor models for image auto-annotation," ICCV, 2009.
Grangier, et al., "A discriminative kernel-based model to rank images from text queries," PAMI, 30(8)1371-1384, 2008.
Weston, et al. "Large scale image annotation: Learning to rank with joint word-image embeddings," ECML, 2010.
Rabinovich, et al., "Objects in context," ICCV 2007.
Desai, et al., "Discriminative models for multi-class object layout," ICCV, 2009.
U.S. Appl. No. 12/512,209, filed Jul. 30, 2009, Perronnin, et al.
U.S. Appl. No. 12/693,795, filed Jan. 26, 2010, Skaff, et al.
U.S. Appl. No. 12/960,018, filed Dec. 3, 2010, Perronnin, et al.
Perronnin, et al. "Fisher Kernels on Visual Vocabularies for Image Categorization," in Proc. of the IEEE Conf on Computer Vision and Pattern Recognition (CVPR) , Jun. 2007.
Csurka, et al. "Visual Categorization with Bags of Keypoints," ECCV *Workshop on Statistical Learning in Computer Vision*, 2004.
Jegou, et al. "Hamming embedding and weak geometric consistency for large scale image search," in ECCV 2008.
Laaksonen, et al. "PicSOM self-organizing image retrieval with MPEG-7 content descriptions," IEEE Transactions on Neural Networks, vol. 13, No. 4, 2002.
Perronnin, et al. "Improving the fisher kernel for large-scale image classification," in ECCV 2010.
Bishop, "Pattern recognition and machine learning" Spinger-Verlag, 2006—Summary only.
Bradley, et al. "Learning tree conditional random fields," in ICML, 2010.
Chow, et al. "Approximating discrete probability distributions with dependence trees," IEEE Transactions on Information Theory, 14(3):462-467, 1968.
Tsochantaridis, et al. "Large margin methods for structured and interdependent output variables," JMLR, 6:1453-1484, 2005.
Branson, et al. "Visual recognition with humans in the loop," in ECCV, 2010.
Lampert, et al., "Learning to detect unseen object classes by between-class attribute transfer," in CVPR, 2009.
Huiskes, et al. The MIR Flickr retrieval evaluation, in ACM MIR, 2008.
Nowak, et al. "New strategies for image annotation: Overview of the photo annotation task at imageclef 2010," in Working Notes of CLEF, 2010.
Choi, et al. "Exploiting hierarchical context on a large database of object categories," in CVPR, 2010.
Platt, "Probabilities for SV machines," in Advances in Large Margin Classifiers, 2000.
Deng, et al. "What does classifying more than 10,000 image categories tell us?" in ECCV, 2010.
Vijayanarasimhan."Multi-level active prediction of useful image annotations for recognition," in NIPS, 2009.
Guillaumin, et al., "Tagprop: Discriminative metric learning in nearest neighbor models for image auto-annotation," ICCV, 2009, pp. 309-316.
Grangier, et al., "A discriminative kernel-based model to rank images from text queries," PAMI, 30(8):1371-1384, 2008.
Weston, et al. "Large scale image annotation: Learning to rank with joint word-image embeddings," ECML, 2010, pp. 21-35.
Rabinovich, et al., "Objects in context," ICCV 2007, pp. 1-8.
Desai, et al., "Discriminative models for multi-class object layout," ICCV, 2009, pp. 1-12.
Perronnin, et al. "Fisher Kernels on Visual Vocabularies for Image Categorization," in Proc. of the IEEE Conf on Computer Vision and Pattern Recognition (CVPR), Jun. 2007, pp. 1-8.
Csurka, et al. "Visual Categorization with Bags of Keypoints," ECCV *Workshop on Statistical Learning in Computer Vision*, 2004, pp. 59-74.
Jegou, et al. "Hamming embedding and weak geometric consistency for large scale image search," in ECCV 2008, pp. 304-317.
Laaksonen, et al. "PicSOM self-organizing image retrieval with MPEG-7 content descriptions," IEEE Transactions on Neural Networks, vol. 13, No. 4, 2002, pp. 841-853.
Perronnin, et al. "Improving the fisher kernel for large-scale image classification," in ECCV 2010, pp. 143-156.
Bradley, et al. "Learning tree conditional random fields," in ICML, 2010, pp. 127-134.
Branson, et al. "Visual recognition with humans in the loop," in ECCV, 2010, pp. 438-451.
Lampert, et al., "Learning to detect unseen object classes by between-class attribute transfer," in CVPR, 2009, pp. 951-958.
Huiskes, et al. "The MIR Flickr retrieval evaluation", in ACM MIR, 2008, pp. 39-43.
Nowak, et al. "New strategies for image annotation: Overview of the photo annotation task at imageclef 2010," in Working Notes of CLEF, 2010 pp. 138-151.
Choi, et al. "Exploiting hierarchical context on a large database of object categories," in CVPR, 2010, pp. 129-136.
Platt, "Probabilities for SV machines," in Advances in Large Margin Classifiers, 2000, pp. 61-74.
Vijayanarasimhan. "Multi-level active prediction of useful image annotations for recognition," in NIPS, 2008, pp. 1705-1712.
Deng, et al. "What does classifying more than 10,000 image categories tell us?" in ECCV, 2010, pp. 71-84.

* cited by examiner

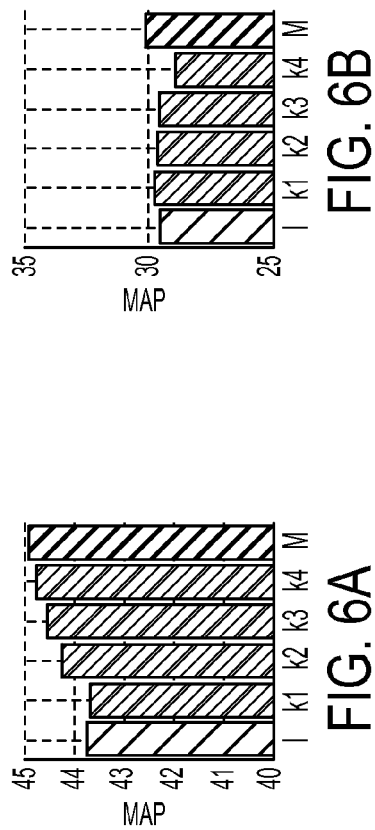
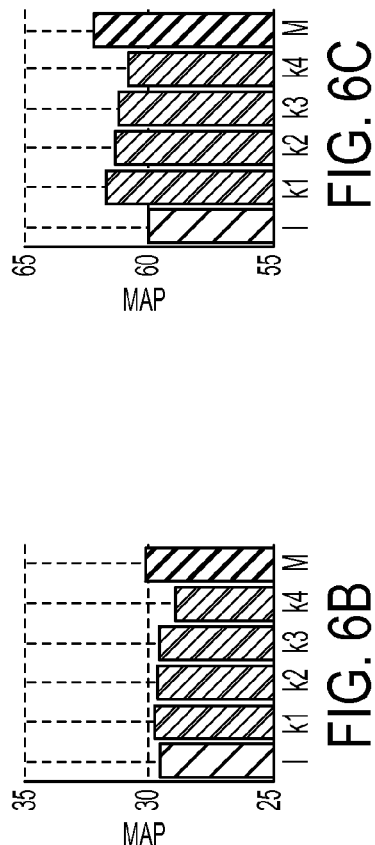
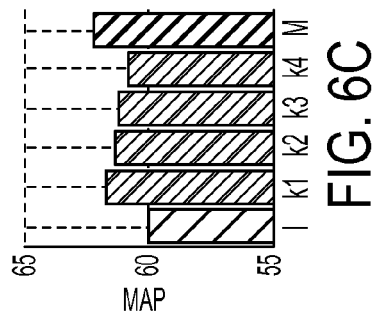
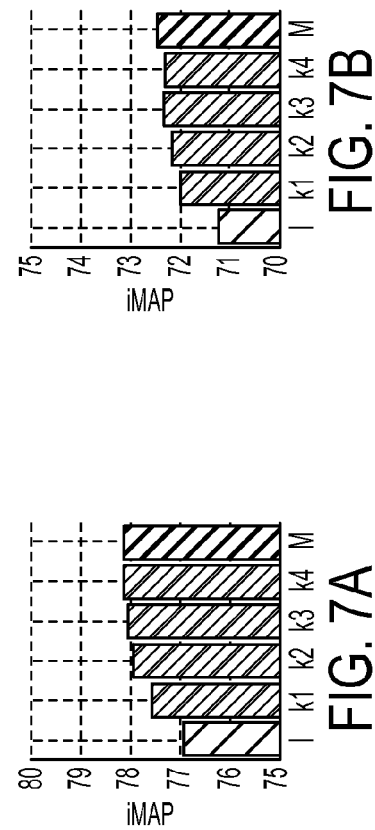
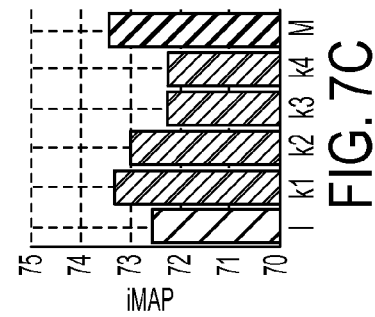
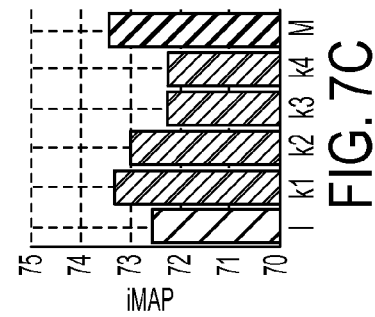

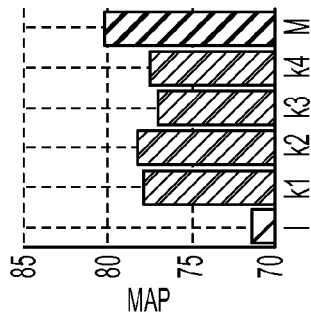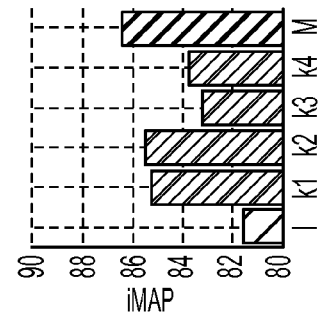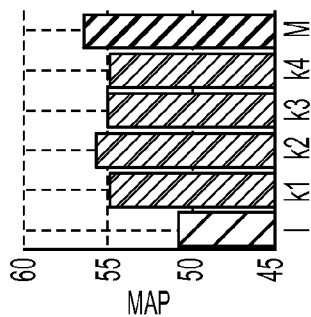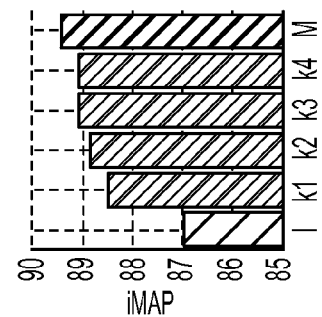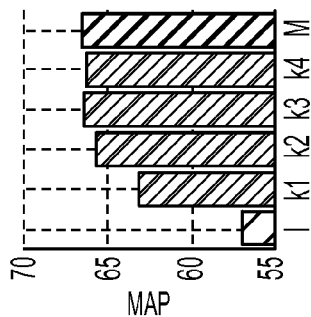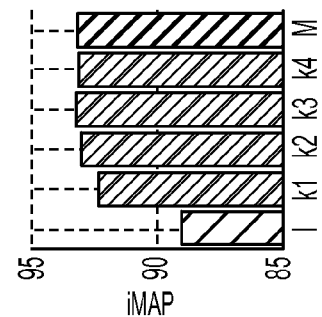

LEARNING STRUCTURED PREDICTION MODELS FOR INTERACTIVE IMAGE LABELING

BACKGROUND

The following relates to the object organization, retrieval, and storage arts. It particularly relates to image labeling, for predicting relevant terms from a given annotation vocabulary for an image.

For a variety of applications it is desirable to be able to classify an image based on its visual content. In some cases, the images are labeled manually. For example, on photo-sharing websites, viewers or authors of the images assign their own labels based on personal perception of the image content. In other cases, fully automatic systems are used where image labels are automatically predicted without any user interaction.

Most work on image annotation, object category recognition, and image categorization has focused on methods that deal with one label or object category at a time. The image can then be annotated with one or more labels corresponding to the most probable class(es). The function that scores images for a given label is obtained by means of various machine learning algorithms, such as binary support vector machines (SVM) classifiers using different (non-) linear kernels (J. Zhang, et al., "Local features and kernels for classification of texture and object categories: a comprehensive study," IJCV, 73(2):213-238, 2007), nearest neighbor classifiers (M. Guillaumin, et al., "Tagprop: Discriminative metric learning in nearest neighbor models for image auto-annotation," ICCV, 2009), and ranking models trained for retrieval or annotation (I.D. Grangier, et al., "A discriminative kernel-based model to rank images from text queries," PAMI, 30(8):1371-1384, 2008; J. Weston, et al. "Large scale image annotation: Learning to rank with joint word-image embeddings," ECML, 2010).

A problem arises in classification when dealing with many classes, for example, when the aim is to assign a single label to an image from many possible ones, or when predicting the probability distribution over all labels for an image. Although, there are correlations in the binary classifier outputs, since the independent predictors use the same input images for prediction, the dependencies among the labels are generally not modeled explicitly.

For example in object class recognition, the presence of one class may suppress (or promote) the presence of another class that is negatively (or positively) correlated. In one study, the goal was to label the regions in a pre-segmented image with category labels (A. Rabinovich, et al., "Objects in context," ICCV 2007. In that study, a fully-connected conditional random field model over the regions was used. In another study, contextual modeling was used to filter the windows reported by object detectors for several categories (C. Desai, et al., "Discriminative models for multi-class object layout," ICCV, 2009); The contextual model of Desai includes terms for each pair of object windows that will suppress or favor spatial arrangements of the detections (e.g., boat above water is favored, but cow next to car is suppressed).

However none of the above methods takes into account the dependencies among the image labels explicitly.

INCORPORATION BY REFERENCE

The following references, the disclosures of which are incorporated herein in their entireties by reference, are mentioned:

U.S. Pub. No. 20090252404, published Oct. 8, 2009, entitled MODEL UNCERTAINTY VISUALIZATION FOR ACTIVE LEARNING, by Loïc Lecerf, discloses an active learning system including a representation module which generates a visual representation of a set of unlabeled elements. The representation shows the unlabeled elements as data points in a space and shows each of a plurality of classes as a class point in the space.

U.S. Pat. No. 7,139,754, issued Nov. 21, 2006, entitled METHOD FOR MULTI-CLASS, MULTI-LABEL CATEGORIZATION USING PROBABILISTIC HIERARCHICAL MODELLING, by Cyril Goutte, et al., discloses a method for categorizing a set of objects, which includes defining a set of categories in which at least one category in the set is dependent on another category in the set, organizing the set of categories in a hierarchy that embodies any dependencies among the categories in the set, and for each object, assigning to the object one or more categories from the set of possible categories for which the object is relevant. A new set of labels is defined comprising all possible combinations of any number of the categories, such that if an object is relevant to several categories, the object is assigned the unique label corresponding to that subset of all relevant categories.

U.S. Pub. No. 2007/0150801, entitled INTERACTIVE LEARNING-BASED DOCUMENT ANNOTATION, by Boris Chidlovskii, et al., discloses a document annotation system which includes a graphical user interface that is used by an annotator to annotate documents. An active learning component trains an annotation model and proposes annotations to documents based on the annotation model.

The following disclose image annotation methods: U.S. Pat. Nos. 6,789,109, 7,577,901, 7,627,556, and 7,636,883.

BRIEF DESCRIPTION

In accordance with one aspect of the exemplary embodiment, an annotation system includes memory which stores a structured prediction model which represents predicted correlations between values assumed by labels in a set of labels. Instructions are provided in memory for generating feature-based predictions for values of labels in the set of labels based on features extracted from the image and for predicting a value for at least one label from the set of labels for the image based on the feature-based label predictions and predictive correlations of the structured model. The predicted value for the at least one label may also be based on an assigned value for at least one other label from the set of labels received for the image. A processor executes the instructions.

In another aspect, a method for labeling images includes providing a structured prediction model in memory which represents predictive correlations between labels in a set of labels. An image to be labeled is received. Feature-based predictions for values of labels in the set of labels are generated based on features extracted from the image. A value for at least one label from the set of labels is predicted for the image based on the feature-based label predictions and predictive correlations of the structured prediction model. Optionally, the predicted value for the at least one label is also based on an assigned value for at least one other label from the set of labels received for the image.

In another aspect, a method for generating an annotation system includes receiving a training set of manually-labeled training images. For each of the training images, for each of a set of labels, a feature function is generated, based on features extracted from the image, which is used to predict a value of the label for the image. The method further includes acquiring mutual information between pairs of labels in a set of labels based on the training images. Optionally, the set of labels is clustered into groups having at most a predetermined number k of labels. Based on the mutual information and feature functions, a structured prediction model represented by a tree structure is generated, in which nodes of the tree structure include a respective single one of the labels or group of the labels. The nodes are linked by edges, each edge representing predicted correlations between values of labels in the pair of nodes connected by the edge. When an image to be labeled is received, the tree structure allows predictions on labels to be informed by the predicted correlations in the tree structure.

BRIEF DESCRIPTION OF THE DRAWINGS

FIG. 6 illustrates mean average precision (MAP) results obtained with the exemplary method in a fully automated mode compared with the independent method for three datasets A, B, and C;

FIG. 7 illustrates mean average precision of labels at the image level (iMAP) in the fully automated mode compared with the independent method for the three datasets A, B, and C;

FIG. 8 illustrates mean average precision (MAP) results obtained with the exemplary method in the interactive mode compared with an independent method for the three datasets A, B, and C;

FIG. 9 illustrates mean average precision of labels at the image level (iMAP) in the interactive mode compared with the independent method for the three datasets A, B, and C;

DETAILED DESCRIPTION

A system and method for image labeling and classification are disclosed. The exemplary system includes structured models for image labeling, which take into account label dependencies. These models are shown to be more expressive than independent label predictors, and can lead to more accurate predictions. The system can be used for fully-automatic image annotation as well as in an interactive mode, where a user provides the value of some of the image labels. In the interactive embodiment, the structured models can be used to decide which labels should be assigned by the user, and to infer the remaining labels conditioned on the user's responses.

The structured models can be applied to image labeling, where an individual image can be assigned more than one label, and attribute-based image classification, where attribute predictions of a test image are mapped to class probabilities by means of a predefined attributes to class mapping. In this case, the structured models are built at the attribute level. In an interactive system, the system may ask a user to set some of the attribute values in order to improve class prediction performance.

The term predictions (image labels/attribute labels) can be used in tools for clustering, classification, retrieval and visualization and find application, for example, in multimedia content management systems, stock photography database indexing, and for exploration such as exploring images on photo-sharing websites.

Figure 1:
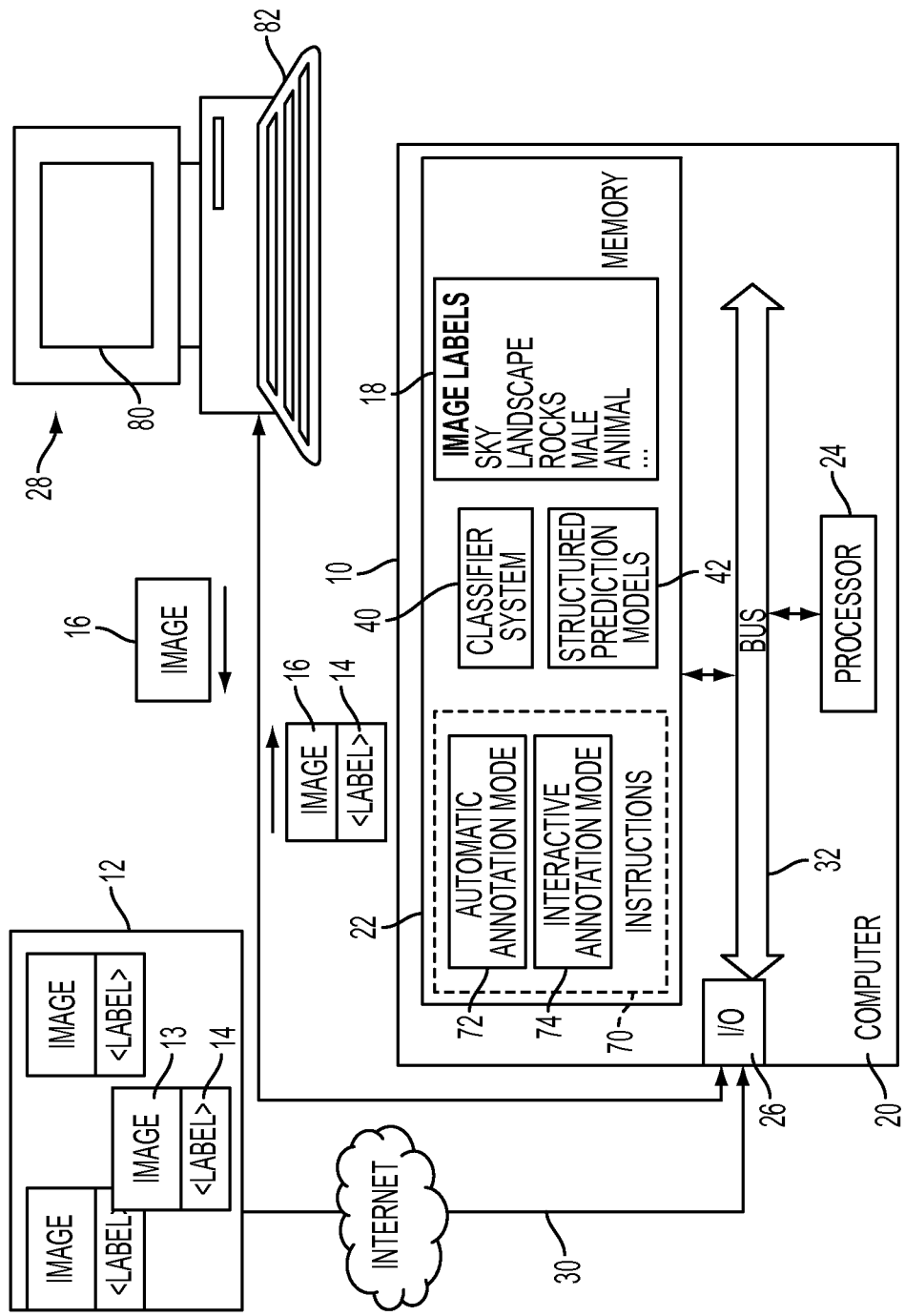
FIG. 1 is a functional block diagram of a system for predicting labels for images in accordance with one aspect of the exemplary embodiment.
Figure 2:
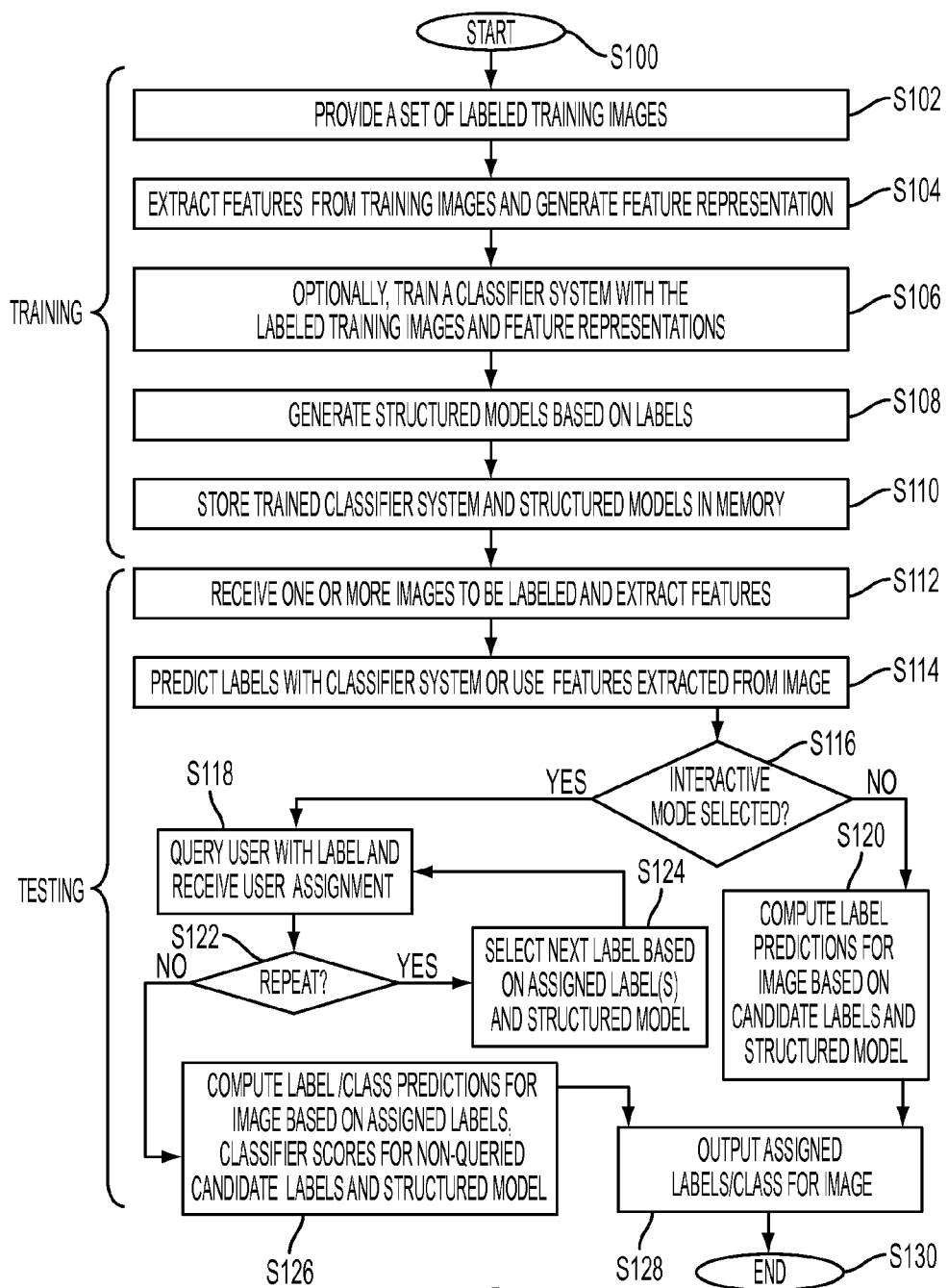
FIG. 2 is a flow diagram illustrating a method for predicting labels for images in accordance with another aspect of the exemplary embodiment.

With reference to FIG. 1, a probabilistic image labeling system 10 has been trained with a set 12 of training images 13 to predict labels 14 for new images 16, which are generally not a part of the training set 12. A method for generating and then using the generated system 10 to predict labels is illustrated in FIG. 2 and is described below.

Images 13, 16 may be received by the system 10 in any convenient file format, such as JPEG, TIFF, or the like. Images may be individual images or video images. In general, each input digital image includes image data for an array of pixels forming the image. The image data may include colorant values, such as grayscale values, for each of a set of color separations, such as RGB or L*,a*,b* or be expressed in another other color space in which different colors can be represented. In general, "grayscale" refers to the optical density value of any single color channel, however expressed (RGB, YCbCr, etc.). Exemplary images 13, 16 are photographs, such as color photographs, although other types of image are also contemplated, such as scanned images, charts, graphs, maps, graphics, and the like. While in the illustrations, images 13, 16 comprising pixel data are received for processing. However, in some embodiments, reduced pixel resolution images, cropped images, or representations of the images derived from the pixel data (such as multidimensional vectorial representations) may alternatively or additionally be received and processed, all of which are considered "images" for purposes of description, unless otherwise noted. The images 13, 16 can be input to the system 10 from an external source or generated within the system.

The labels 14 are drawn from a predefined set 18 of labels (an "annotation vocabulary"), which may correspond to a set of visual categories, such as landscape, trees, rocks, sky, male, female, single person, no person, animal, and the like. In the exemplary embodiment, there are a large number of such categories, such as at least fifty categories. The training images 12 are each manually labeled with one or more labels 14 drawn from the set 18 of labels. These manually assigned labels may be the output of a single user or computed from the labels assigned by a set of users. In the following description, each label in the set of labels 18 can assume one of two or more predefined values, which in the simplest (binary) case, represent whether the image should be labeled with that label or not. A user can be any person who supplies labels for images, e.g., views a training image (or, in an interactive mode, a new image) and, based on his or her observations, decides whether a label is true for the image, i.e., whether the image includes visual content which corresponds to the label, such as sky. The images in the training set 12 may each have one or more labels, or, more specifically, manually assigned values which indicate that one or more of the labels is considered true for that image while other labels (e.g., by default) are not.

The images 16 to be labeled may be images without any labels. In other embodiments, the images 16 may have had some labels assigned (e.g., as tags obtained from a photo-sharing site such as Flikr™), but the annotation is not complete. Or, the images 16 may have received a small number of labels from a small label set automatically or manually applied and the objective is to expand the annotation to a larger label set 18.

The system 10 may be resident on one or more computing device(s) 20 including memory 22, a processor 24, and one or more input/output (I/O) interface devices 26, which connect the system 10 with external devices, such as a graphical user interface (GUI) 28, via a wired or wireless link 30, such as a wire, telephone connection, local area network, or wide area network, such as the Internet. The components 22, 24, and 26 may be communicatively connected by one or more data control buses 32.

The system 10 optionally includes a classifier system 40, stored in memory 22, which has been trained on training images to predict labels 14 for new images, based on image content. Such classifier systems are well known and can be based, for example, on a variety of training algorithms, such as, for example: linear discriminants such as linear least squares, Fisher linear discriminant or Support Vector Machines (SVM); decision trees; K-nearest neighbors (KNN); neural networks, including multi-layer perceptrons (MLP) and radial basis function (RBF) networks; and probabilistic generative models based e.g., on mixtures (typically Gaussian mixtures). The exemplary classifier system 40 may include a set of binary classifiers, each trained on a respective one of the categories (labels) in the set 18. These are referred to as independent prediction models, since each class (label) is predicted independently of the other classes. In the examples below, SVM classifiers using RBF kernels are described, by way of example. The classifier is fed with the training image label and a feature representation based on features extracted from the image. On a new image, the classifier 40 outputs a feature function which, for each label, indicates whether that label is true (e.g., as a binary value or a probability). In other embodiments, the feature representation extracted from the image may be used directly as the feature function. For example, a Fisher vector may be generated from features extracted from the image in which each value of the vector is associated with a visual word corresponding to one of the labels.

The system 10 stores a set of one or more structured prediction models 42 (or simply, "models") that take into account dependencies among image labels 14 explicitly. Each model 42 models interactions between the labels 14 in the set 18. The structured model thus represents predictive correlations between pairs of labels. In this way, labels 14 for a new image 16 are not predicted independently of each other but are based on the predicted correlations between pairs of labels represented by the model.

Figure 3A:
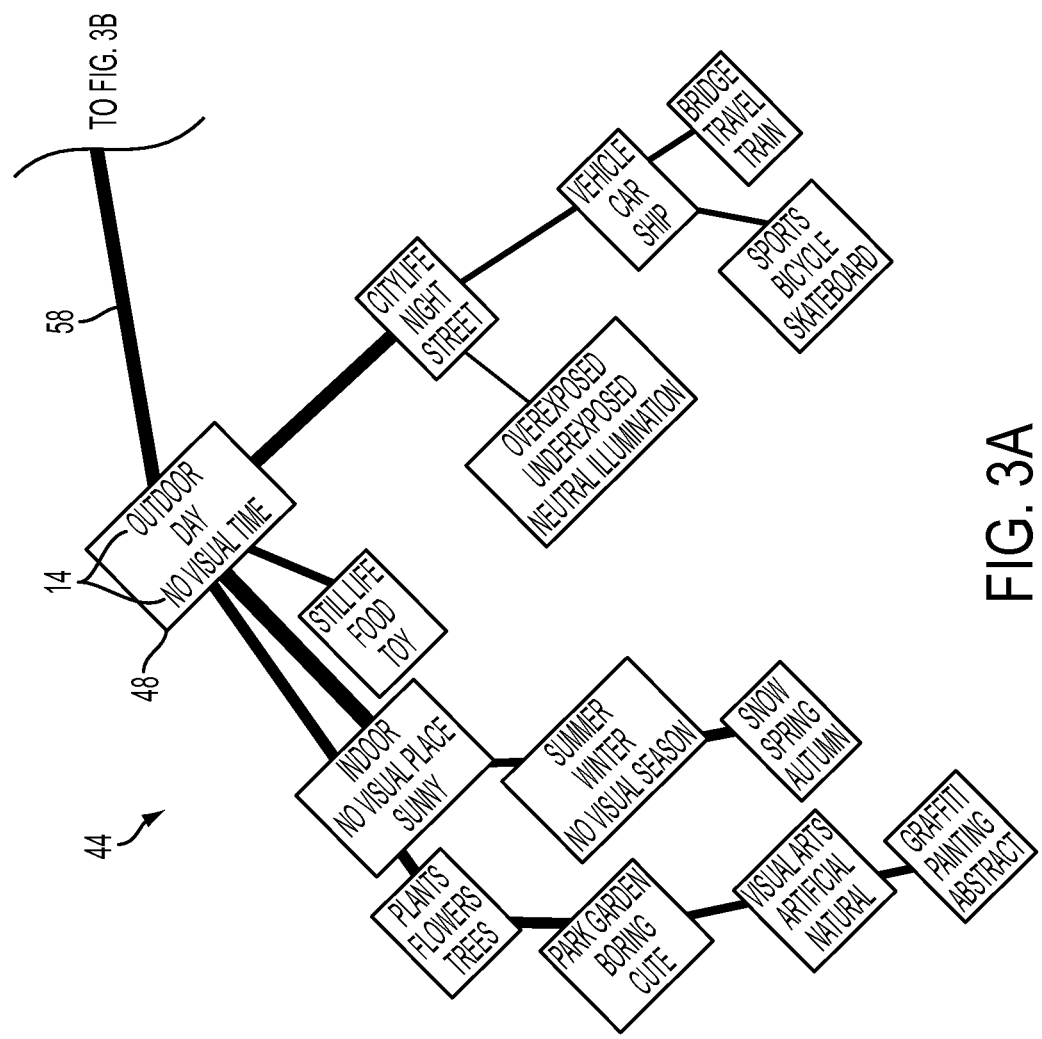
FIG. 3 illustrates a graphical model in the form of a tree structure.
Figure 3B:
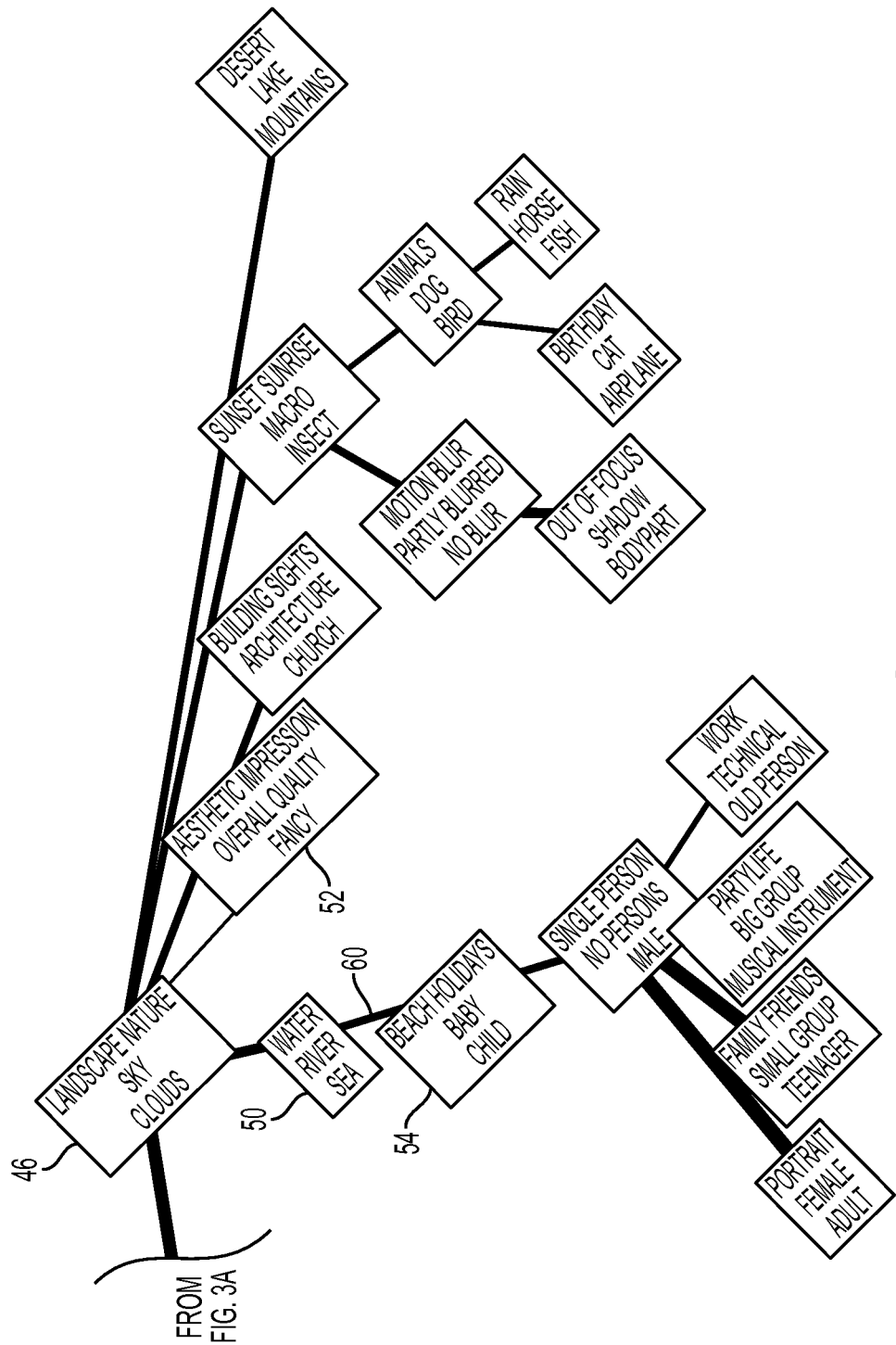

The exemplary structured prediction model 42 can be graphically represented by a tree structure 44 in which nodes of the tree have at most a predefined number k of labels, where k is less than the total number L of possible labels, such as k=1, 2, 3, 4, etc. For example k may be up to 10. FIG. 3 shows an example of a tree 44 over groups of at most k=3 labels for an example dataset having a total L of 93 labels (the Image-CLEF 2010 dataset, see S. Nowak and M. Huiskes, "New strategies for image annotation: Overview of the photo annotation task at ImageCLEF 2010," in Working Notes of CLEF 2010, Padova, Italy (2010)). In the exemplary embodiment, the system stores a plurality of structured prediction models, one for each of a respective value of k. Thus, for example, one structured model may be for k=3 and another for k=4, etc. In the exemplary graphical model 44, a tree structure is obeyed, where every label 14 in the set 18 of labels appears in exactly one node and no node can have more than one parent (i.e., cannot be in a path defined by three or more edges which leads back to itself in a loop, such as three nodes linked in a triangle, six nodes linked in a hexagon, or the like), for ease of computation. However, other graphical models which are not pure tree structures are also contemplated, with a denser connectivity, in which such loops may be permitted.

The tree 44 includes a root node 46 which includes a group (subset) of the labels 14, here illustrated as the three labels: landscape_nature, sky, and clouds. The root 46 is linked to a plurality of other nodes 48, 50, 52, etc., each of which, like the root node, has at least one and at most, k=3 labels and may, in turn, be connected to further linked nodes, such as nodes 54, 56. The various nodes are connected by edges 58, 60, etc. In the exemplary tree, each node is connected to only a single respective parent node, with the exception of the root node 46, and each node can have 0, 1, or more child nodes. Generally, a plurality of the nodes has both a parent and at least one child node and at least one or a plurality of these child nodes also have at least one child node. In the graphical illustration, the thickness of each edge 58, 60, is proportional to the mutual information shared between the linked nodes. This mutual conditional information, as described below, is in the form of predictive correlations which are extracted from the labels 14 for the images 13 in the training set 12. Each predictive correlation expresses the ability to predict, for an image 13, given that it has a certain value for a label of a first node, that the image also has a certain value for a label of a second node that is linked by the edge to the first node. In other words, it expresses how much the label value(s) for one node is/are conditional on the label value(s) of another. Thus for example, if one node 50 has the label sea and a linked node 54 has the label boat, the edge 60 between the two nodes is likely to be quite thick, because an image 13 with sea in it often has a boat in it, and vice versa, thus, an image label sea is a good predictor that the image is also labeled boat. The conditional information not only reflects cases where one label follows another but also reflects how good a predictor a label in a first group is of the image not being labeled with a label from a second group. Thus for example, the node for boat linked to the sea node could also include the label car, since an image of the sea is relatively unlikely to have a car in it. Knowing that an image is labeled sea is a good predictor that the image should not have the label car. The conditional information can be propagated not simply to the most closely adjacent nodes, but through a path linking one node to a more distant node as a function of the conditional information associated with each of the two or more intervening edges.

In the illustrated tree 44, the root 46 of the tree has been chosen as the vertex (node) with highest degree, i.e., the node which is directly linked by edges to the highest number of other nodes. As will be appreciated, however, the choice or root node 46 can be arbitrary or selected in some other way.

Returning to FIG. 1, the exemplary system 10 includes instructions 70 stored in memory for performing the exemplary method. The system 10 can operate in one or both of a fully automatic image annotation mode (using instructions 72) and an interactive mode (using instructions 74). In the fully automated mode, the system 10 operates to predict labels 14 for one or more images 16 without user interaction. In the interactive mode, the trained system 10 operates to predict labels 14 for a set of images 16 where a user is asked to confirm or reject some of the image labels 14, e.g., via GUI 28. Predictions for further labels 14 are then conditioned on the user's input.

The interactive mode is useful, for example, for indexing of images 16 for stock photography, where a high indexing quality is desired, yet where a full manual indexing is not practical. In this case, the label dependencies in the structured models 40 can be leveraged in two ways. First, the structured models 42 are able to transfer the user input for one image label 14 to more accurate predictions on other image labels. This is not possible with independent prediction models. Second, using the structured models 42, the system 10 does not tend to query, wastefully, for image labels that are either highly dependent on already provided labels, or which can be predicted with a high certainty from the image content. Thus, for example, in the boat, sea, car example above, the system 10 may have identified a set of possible labels, sea, boat, rocks, for an image 16, using the trained classifier 40. The user may be asked to confirm the label sea. Knowing this label, it is likely that the second label boat, is correct, so the system 10 does not need to ask the user whether that label should be applied to the image 16. Rather, the user may be asked to verify the label rocks, which in this example, is in a third node at some distance from the first and second nodes. Through inference in the graphical model 44, the system fuses the information from the image content and the user responses, and is able to identify labels that are highly informative, once provided with some information by the user.

As will be appreciated, although the various components 40, 42, 72, 74, are illustrated as separate software components that are implemented by the processor 24, one or more of these may be separated into additional components or combined.

The memory 22 may represent any type of tangible computer readable medium such as random access memory (RAM), read only memory (ROM), magnetic disk or tape, optical disk, flash memory, or holographic memory. In one embodiment, the memory 22 comprises a combination of random access memory and read only memory. In some embodiments, the processor 24 and memory 22 may be combined in a single chip. The network interface 26 allows the computer to communicate with other devices via a computer network, such as a local area network (LAN) or wide area network (WAN), or the Internet, and may comprise a modulator/demodulator (MODEM). Memory 22 stores instructions for performing the exemplary method as well as the processed data.

The digital processor 24 can be variously embodied, such as by a single-core processor, a dual-core processor (or more generally by a multiple-core processor), a digital processor and cooperating math coprocessor, a digital controller, or the like. The digital processor 24, in addition to controlling the operation of the computer 20, executes instructions stored in memory 22 for performing the method outlined in FIG. 2.

While computers 20 and 28 are shown as separate devices, they may be combined or some or all of their components distributed over a network.

Figure 4:
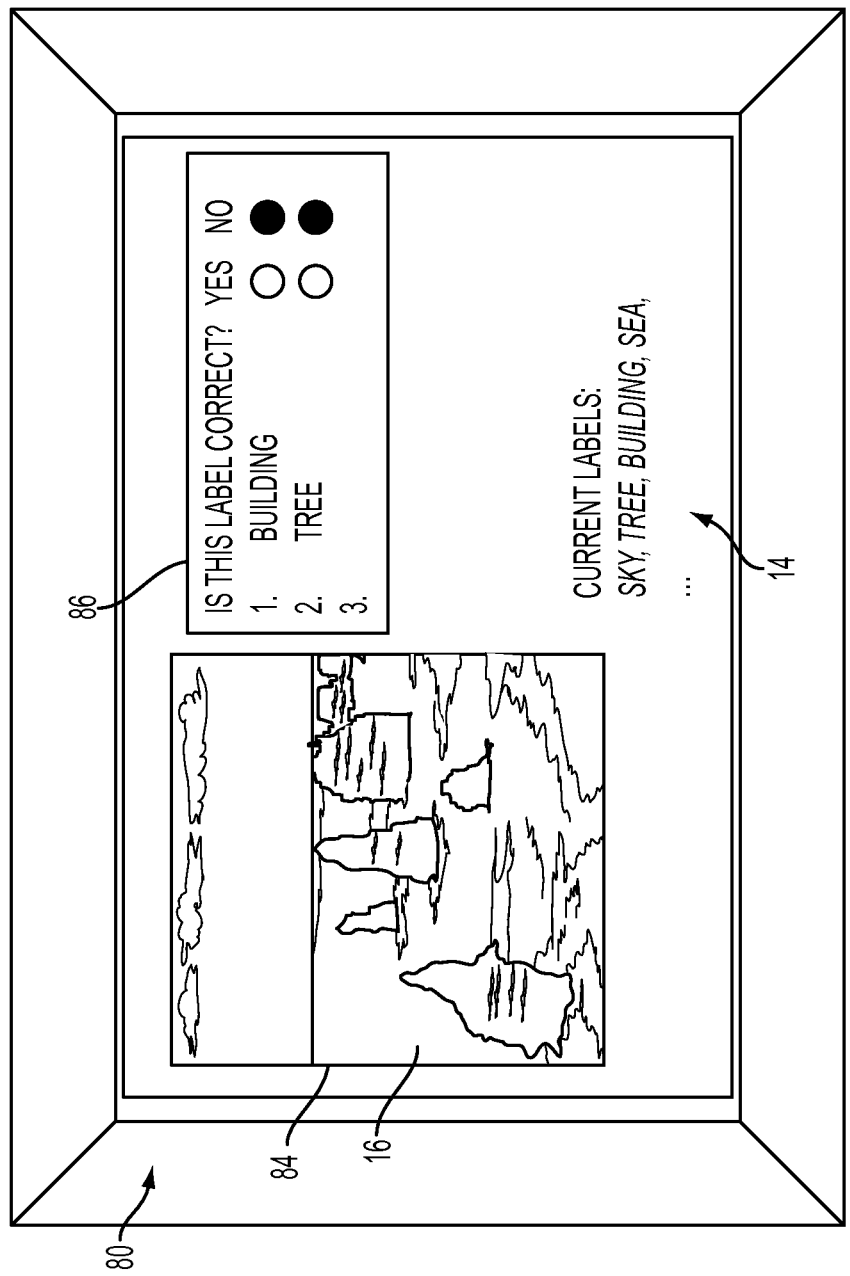
FIG. 4 is a screenshot of a user interface during labeling of an image in an interactive mode.

The user's computer 28 which serves as the GUI may be a PC, such as a desktop, a laptop, palmtop computer, portable digital assistant (PDA), server computer, cellular telephone, tablet computer, or other computing device. Computer 28 has memory and a processor, analogous to computer 20. In addition to memory storage for images 16, the computer 28 includes a display device 80, such as an LCD screen, plasma screen, or the like, which displays images to a user for labeling (in the interactive mode). A user input device 82, such as a keyboard, key pad, or touch or writable screen, and/or a cursor control device, such as mouse, trackball, or the like, is used for inputting labels selections and/or for communicating other user input information and command selections to the system 10. For example an interface 84 as shown in FIG. 4 is displayed on the user's display device 80. The interface 84 shows the image 16 to be labeled and may also display the set of labels predicted by the classifier, optionally updated to reflect the user's responses to a set of queries 86. The user clicks on a selection or otherwise indicates his response to each of the queries that are presented in turn, thereby assigning values to a subset (fewer than all) of the labels 14.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 1 is a high level functional block diagram of only a portion of the components which are incorporated into a computer system 10. Since the configuration and operation of programmable computers are well known, they will not be described further.

With reference now to FIG. 2, a method for image label prediction is illustrated. The method begins at S100.

At S102, a set 12 of manually-labeled training images 13 is provided, each image having at least one manually-assigned label from a finite set 18 of labels. In the case where the labels are attribute labels, a mapping between each class label of a set of class labels and a respective configuration of attribute labels is also input.

At S104, features are extracted from each of the training images based on the visual content of the image and a feature representation is generated based on the extracted features (e.g., in the form of a features vector).

At S106, the feature representations of the training images and their respective labels may be use to train a classifier system 40. This step is optional. In other embodiments, the features vector (such as a Fisher vector) is used as a feature function of the image and is used directly as label predictions for each of the images.

At S108, one or more structured models 42 are generated, based on the labels 14 and on either the image features (S104) or the classifier output (S106). This includes computing a graph structure based on the maximum spanning tree over a fully connected graph over the label variables with edge weights given by the mutual information between the label variables. The graph contains node potentials, which are a weighted sum of the image features (S104) or image classifier scores (S106), and edge potentials of the tree-structured conditional model, which are scalar values. The parameters are then computed by log-likelihood maximization. At S108, one or more structured models 42 are generated, based on the labels 14 and the classifier output. This includes computing the maximum spanning tree over a fully connected graph over the label variables with edge weights given by the mutual information between the label variables.

At S110, the trained classifier system 40 and structured models 42 are stored in computer memory 22. This completes the training phase. As will be appreciated, the classifier system 40 and structured models 42 can be transferred to a different computer and/or memory for the application phase.

At S112, at test time, one or more images 16 to be labeled are received, and may be stored in computer memory 22. A feature representation may be extracted from the image, if not already generated.

In some embodiments, information may be extracted from textual information associated with the image 16, e.g., in the form of metadata or an assigned label. This information may be used to preassign values to one or more of the labels, but fewer than all labels. For example, if an image 16 has been already labeled with a text label or metadata for "blue sky" the system may preassign a label value to the label "sky" based on this information. The preassigned label value may correspond to a very high confidence that the label is correct, for example, if there is an exact match, or to a lower confidence where the information is not an exact match or is considered not to be completely reliable.

At S114, the classifier 40 may be used to assign the feature function (feature-based labels/label predictions over all labels in set 18), to the image 16. In some embodiments, the classifier 40 may take as input the preassigned label values as well as the feature representation of the image. In other embodiments, a feature function generated solely from the image, such as a Fisher vector, is used as to provide the feature-based label predictions.

If at S116, an interactive mode as been selected (e.g., by a user or by default), the method proceeds to S118, otherwise to S120.

At S118, in the interactive mode, the user is presented with a label 14 and asked to provide its value, i.e., whether the label is true for the image. The user responds, e.g., with a yes or no response. The information is received by the system 10 and stored in memory as a value for that image. In the exemplary embodiment, the user's yes/no value of a label is not questioned, i.e., is assigned a 100% confidence of being correct. In other embodiments, less weight may be placed on the user's values, to account for occasional mistakes, such as a 90% or 95% confidence of being correct. Predictions on the other labels are updated using tree-structured inference. Preassigned label values may be treated in the same way as user assigned label values, i.e., used to predict other labels using the tree structured inference.

The method then proceeds to S122.

If at S122, if a stopping criterion has not been reached, the system decides to repeat the querying, the next label to be queried is selected at S124. The stopping criterion may be a predetermined number of questions to be asked of the user or may depend on a confidence the system has on the remained label predictions, or a combination thereof. Other stopping criteria may applied. The label to be queried may be selected randomly or by operation of one or more label elicitation criteria. In the exemplary embodiment, this is based structured prediction model 42, where the selection is also informed by the previously assigned label value(s). In one embodiment, the label elicitation criterion is based on maximizing entropy of the label distribution.

The method then returns to S118. Once the system 10 has received the user assignments for the labels, the method proceeds to S126, where label predictions are computed. For example, inference on the tree-structure is used to find the most likely joint labeling for the new image 16. The label predictions are thus based on the feature-based predictions of the classifier, modified by the user's assigned values, if any and/or any preassigned label values, which are propagated through the structured model to other labels via the predictive correlations.

At S128, the image is labeled, e.g., with one or more of the most probable labels computed at S126, with predictions over all labels. In the case of attribute labels, the image is labeled with a class which is based on the combination of predicted values for the attribute labels. In the case of attribute labeling, the predicted class can be a class which is unseen in the training set.

The method ends at S130.

In the case where the automatic labeling mode is selected, e.g., by a user or by default, then at S120, label predictions are computed based on the feature-based predictions, any preassigned label values, and the structured model 42.

The method then proceeds to S128 where assigned labels/class prediction(s) are output as for the interactive mode.

As will be appreciated, the method can readily be used for labeling a large number of images 16 semi-automatically by asking a user to provide a predetermined number of the labels in the interactive mode, with the system then predicting some or all the rest of the labels.

The method illustrated in FIG. 2 may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the method.

In the following, the terms "optimization," "maximization," "minimization," and similar phraseology are to be broadly construed as one of ordinary skill in the art would understand these terms. For example, these terms are not to be construed as being limited to the absolute global optimum value, absolute global minimum, and so forth. For example, maximization of a function may employ an iterative maximization algorithm that terminates at a stopping criterion before an absolute maximum is reached. It is also contemplated for the optimum or minimum value to be a local optimum or local minimum value.

Aspects of the system and method will now be described. Classifier Training/Feature-Based Predictions (S104, S106, S114)

The classifier 40 may take as input a feature representation, which is extracted based on low level features of an image 13, 16. Methods for generating feature-based predictions (categorization of the visual content of an image) based on such descriptors and for training a classifier using them are described for example, in U.S. Pub. Nos. 2007005356, 20070258648, 20080069456, 20080317358, 20090144033, 20100040285, 20100092084, 20100098343, and 20100318477, U.S. application Ser. No. 12/512,209, filed Jul. 30, 2009, U.S. application Ser. No. 12/693,795, filed Jan. 26, 2010, U.S. application Ser. No. 12/960,018, filed Dec. 3, 2010, the disclosures of which are incorporated herein by reference, and in the following references: Perronnin, F., Dance, C., "Fisher Kernels on Visual Vocabularies for Image Categorization," in Proc. of the IEEE Conf on Computer Vision and Pattern Recognition (CVPR), Minneapolis, Minn., USA (June 2007); G. Csurka, C. Dance, L. Fan, J. Willamowski and C. Bray, "Visual Categorization with Bags of Keypoints," ECCV *Workshop on Statistical Learning in Computer Vision*, 2004; Nerve Jegou, Matthijs Douze, and Cordelia Schmid, "Hamming embedding and weak geometric consistency for large scale image search," in ECCV 2008; Jorma Laaksonen, Markus Koskela, and Erkki Oja, "PicSOM self-organizing image retrieval with MPEG-7 content descriptions," IEEE Transactions on Neural Networks, vol. 13, no. 4, 2002, by way of example.

For example, the classifier 40 includes or accesses a patch extractor, which extracts and analyzes content-related features of patches of the image 13, 16, such as shape, texture, color, or the like. The patches can be obtained by image segmentation, by applying specific interest point detectors, by considering a regular grid, or simply by random sampling of image patches. The extracted low level features (such as vectors) from each patch can be concatenated to form a features vector. In other approaches, the feature vectors of an image are assigned to clusters. For example, a visual vocabulary is previously obtained by clustering low-level features extracted from training images, using for instance K-means. Each patch vector is then assigned to a nearest cluster and a histogram of the assignments can be generated. In other approaches, a probabilistic framework is employed. For example, it is assumed that there exists an underlying generative model, such as a Gaussian Mixture Model (GMM), from which all the vectors are emitted. In this case, the visual vocabulary can be estimated using the Expectation-Maximization (EM) algorithm. In either case, each visual word in the vocabulary corresponds to a grouping of typical low-level features. The visual words may each correspond (approximately) to a mid-level image feature such as a type of visual (rather than digital) object (e.g., ball or sphere, rod or shaft, etc.), characteristic background (e.g., starlit sky, blue sky, grass field, etc), or the like. Given an image to be categorized, each extracted feature vector is assigned to its closest visual word in the previously trained vocabulary or to all visual words in a probabilistic manner in the case of a stochastic model. Based on this assignment, a single label (or set of labels) can be assigned or a probabilistic assignment over all labels can be made. In the exemplary embodiment, Fisher kernels or Fisher vectors are used as the feature representation. In this embodiment, the low level features are computed over two channels (gradient orientation histograms and color features) and a Fisher kernel is extracted for each and combined. See, F. Perronnin, J. Sánchez, and T. Mensink, "Improving the fisher kernel for large-scale image classification," in ECCV 2010).

The exemplary classifier takes the feature representation of an image 16 and generates a feature function, such as a vector, in which each label is assigned a score in the vector.

In other embodiments, the Fisher vector or other feature representation is used directly as the feature function for the image 16, without using the classifier.

Structured Image Annotation Models (S108) and Predictions (S126)

Figure 5:
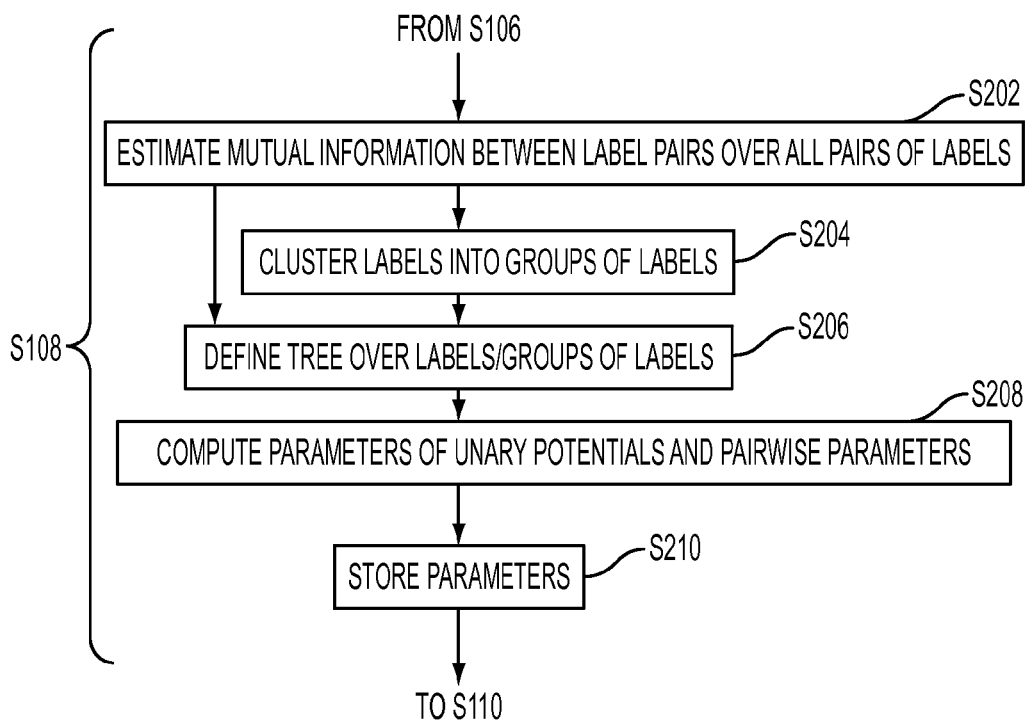
FIG. 5 illustrates part of the method of FIG. 2 in accordance with one aspect of the exemplary embodiment.

The exemplary method employed in S108 is shown in more detail in FIG. 5 and includes identifying a tree structure over all the labels in the set 18 and then storing mutual information (prediction correlations) represented by each of the edges. The tree can be generated by first identifying mutual information of pairs of labels using the training set 12 of manually labeled images (S202). This may include, for each pair of states (values) that the two labels in a pair of labels can assume, estimating the probability of their co-occurrence. For example, given that a training image 13 is labeled boat, what is the probability it will be also labeled car (or not car).

At S204, the labels 14 may be clustered into groups using a clustering algorithm.

At S206, a tree 44 is computed which links a set of nodes 46, 48, 50, 52, etc. (each having a single label or group of labels) by edges 58, 60 between pairs of nodes, each label being in one of the nodes. The edges define those pairs of nodes for which mutual information between the nodes will be taken into consideration in the label prediction for an image 16 (and consequently, excluding from the prediction, mutual information shared by the pairs of nodes unconnected by an edge).

At S208, parameters of unary and pairwise potentials are learned, using the training data 12, by optimizing a log-likelihood function. These potentials and their parameters are described in greater detail below.

At S210, the parameters are stored in memory 22 to be used in predicting label values for a new image.

Exemplary structured prediction models 42 will now be described. Section 1 describes tree-structured conditional models over single labels. Section 2 extends the models to tree-structured conditional models over groups of labels. Section 3 describes the combination of trees of different sizes for label prediction. Section 4 describes the extension to attribute-based image classification. Section 5 describes label elicitation in the interactive scenario. Section 6 describes a method for assigning labels to images using the generated tree structure.

1. Tree-structured Model on Single Image Labels

A tree-structured conditional random field can be used and the tree 44 and is defined such that each node 46, 48, etc. represents exactly one label 14 from the annotation vocabulary 18. Let $y=\{y_1, \ldots, y_L\}$ denote a vector of the L label variables. For sake of simplicity of description only, the labels are assumed to be binary valued, i.e., $y_i \in \{0,1\}$ corresponding, for example, to no label and label, respectively. Thus, for example, in the case of the 93 labels 14 in the ImageCLEF example above, the vector y for a labeled image 16 will have 93 values, most of which will be 0.

Let $\epsilon = \{e_1, \ldots, e_{L-1}\}$ define the possible edges 58, 60, etc. in the tree 44 over the label variables, where $e_j=(i,j)$ indicates the presence of an edge between two labels $y_i$ and $y_j$. Let x represent an image 13, 16. An exemplary structured model 42 is a tree-structured conditional model where the probability p(y|x) of the set of image labels y given the image x can be defined as:

$$p(y \mid x) = \frac{1}{Z(x)} \exp - E(y, x), \quad (1)$$

$$E(y, x) = \sum_{i=1}^{L} \psi_i(y_i, x) + \sum_{(i,j) \in \varepsilon} \psi_{ij}(y_i, y_j) \quad (2)$$

where:

$$Z(x) = \sum_{y \in \{0,1\}^L} \exp - E(y, x) \quad (3)$$

is an image-dependent normalizing term known as the partition function, and E(y,x) is an energy function which scores the compatibility between an image x and a label vector y. The first terms $\psi_i(y_i, x)$ in Eqn. (2) are referred to as the unary potentials. These are independent of the tree 44 and are each dependent on the visual similarity between the image and a label (for example, $\psi_i(y_i, x)$ may be a function of the classifier score for label $y_i$). The second terms $\psi_{ij}(y_i, y_j)$ in Eqn. (2) are referred to herein as pairwise potentials or edge potentials. Each of these is a tree-dependent term, which expresses the conditional probabilities in the tree, i.e., only provides scores for those pairs of labels $y_i, y_j$ that are connected by an edge $\varepsilon$. Thus, the label probabilities p(y|x) are dependent on both the unary and pairwise potentials.

To define the energy function E(y,x), generalized linear functions can be used for the unary potentials (tree-independent label predictors):

$$\psi_i(y_i=l,x)=\phi_i(x)^T w_i^l, \quad (4)$$

where $\phi_i(x)$ is a feature function of the image (such as a classifier score for the image for given label i, a Fisher vector element, or the like), l is a value of a label $y_i$(0 or 1 in the present case), T represents the transpose operator, and the $w_i^l$ are weighting parameters (i.e., unary potential parameters identified at S208).

For efficiency, compact feature functions of the form $\phi_i(x)=[s_i(x),1]^T$ are used, where $s_i(x)$ is an SVM (support vector machine) score output by classifier system that is associated with label variable $y_i$. However, it is to be appreciated that the exemplary model allows for more complex unary feature functions, e.g., by extending $\phi_i(x)$ to include the results of a set of different classifiers, optionally trained on different modalities or feature channels.

The pairwise potentials $\psi_{ij}(y_i, y_j)$ are independent of the image input. They are defined by scalar parameters of each pair of corresponding labels:

$$\psi_{ij}(y_i=s, y_j=t)=v_{ij}^{st}. \quad (5)$$

where s and t are the states (values) of respective labels $y_i$ and $y_j$. For example if the states are binary (on, off), there are four possible values of $v_{ij}^{st}$, which are computed at S208.

Since the model 42 is tree-structured, inference is tractable and can be performed by standard belief propagation algorithms (see, e.g., C. Bishop, "Pattern recognition and machine learning." Spinger-Verlag, 2006, "Bishop"). Inference is used in the exemplary embodiment to evaluate the partition function Z(x), to find marginal distributions on individual labels p($y_i$|x), the pairwise marginals p($y_i, y_j$|x), and the most likely joint labeling state: $y^* = \arg\max_y p(y|x)$.

To determine a useful tree structure over the labels automatically (S206), a method analogous to those developed for generative models can be employed since finding the optimal tree structure for conditional models is generally intractable (see, J. Bradley and C. Guestrin, "Learning tree conditional random fields, in ICML, 2010). The optimal tree structure 44 for a generative model of a multivariate distribution can be computed using the Chow-Liu algorithm (see, C. Chow and C. Liu, "Approximating discrete probability distributions with dependence trees," IEEE Transactions on Information Theory, 14(3):462-467, 1968). Given a fully connected graph (i.e., a non-tree graph where every label is connected to every other label), this algorithm computes the maximum spanning tree over the label variables with edge weights given by the mutual information between the label variables. The mutual information between pairs of label variables can be estimated from the empirical distribution on the training data (S202). The Chow-Liu algorithm can then be applied to this information to obtain the tree structure.

Having identified a particular tree structure 44, the parameters of the unary and pair-wise potentials can be learned by the maximum likelihood criterion (S208). Given N training images 13 $x_n$, and their label annotations $y_n$, this may seek to maximize the equation:

$$\mathcal{L} = \sum_{n=1}^{N} \mathcal{L}_n = \sum_{n=1}^{N} \ln p(y_n | x_n). \quad (6)$$

where $\mathcal{L}_n$ is a log likelihood function for the nth training image.

As the energy function is linear in the parameters, the log-likelihood function is concave, and the parameters can be optimized using gradient descent-based methods (see, for example, Dimitri P. Bertsekas, Nonlinear Programming, Athena Scientific, $2^{nd}$ Ed. ISBN: 1-886529-00-0).

Computing the gradient involves evaluation of the marginal distributions on single variables, and pairs of variables connected by edges in the tree. Using $y_{in}$ to denote the value of variable i for training image n, this gives:

$$\frac{\partial \mathcal{L}_n}{\partial w_i^l} = (p(y_i = l | x_n) - [\![y_{in} = l]\!]) \phi_i(x_n), \quad (7)$$

$$\frac{\partial \mathcal{L}_n}{\partial v_{ij}^{st}} = p(y_i = s, y_j = t | x_n) - [\![y_{in} = s, y_{jn} = t]\!], \quad (8)$$

where $[\![\bullet]\!]$ equals 1 if the expression is true, and 0 otherwise. The gradients output from Eqns. (7) and (8) can be input to a gradient descent algorithm to optimize $\mathcal{L}$.

To get $\psi_i(y_i, x)$ and $\psi_{ij}(y_i, y_j)$, therefore, the gradient optimization of Eqn. 6, using the gradients from Eqn. 7 and 8, gives the sets of parameters w and v. Together with the (given) image features/classifier scores, these parameters give the result of the unary and pairwise potentials. (Eqns. 4, 5 and 2).

2. Trees Over Groups of Label Variables

The tree structure 44 over single labels described above is limited in the number of dependencies it can express by the number of edges that can be accommodated in the tree structure. To accommodate for more dependencies between labels in the model 42, an extension of the single label per node case above is considered: the label variables are first grouped (S204), and then a tree is defined over these groups (S206). A label group can be seen as fully connected set of variables in the graphical model. If k equals the number of labels L, this gives a fully connected model, and only one group, i.e., no tree. In the present case, a maximum group size is selected which is substantially less than L.

To find the tree, agglomerative clustering, based on mutual information is first performed, fixing in advance the maximum group size k. This results in a set of groups which will become the nodes, but which as yet are unconnected. The clustering aims to associate labels in a group, based on the co-occurrence of their states in the training set.

After the clustering, the tree is built (S206) using the Chow-Liu algorithm, as before.

In the tree structure 44 shown in FIG. 3, a tree with group size 3 is illustrated by way of example. Although not forced, semantically related concepts are often grouped together, i.e., Water, River, and Sea, or linked together in a sub-tree, as in the sub-tree around the Single Person node. While in the example, all the groups have 3 labels, this is not necessarily the case, there could be groups with only one or two labels.

Let $\{\mathcal{G}_i\}_{g=1}^G$ denote the partition of original labels $\{1, \ldots, L\}$ into G groups, such that if $g \neq h$ then $\mathcal{G}_g \cap \mathcal{G}_h = \emptyset$, and $\cup_{g=1}^G \mathcal{G}_g = \{1, \ldots, L\}$. Every label is thus in one and only one group. With each group of variables, a new variable $y_g$ is associated that takes as values the product space of the values of the labels in the groups. Thus, for groups of k binary labels, the label variables can take $2^k$ values, and there is a one-to-one mapping between the values of the variables in the group and the value of the group variable.

The unary potentials are defined as in Eq. (4), where $y_i$ is replaced with $y_g$, and hence takes one of the $2^k$ sets of values according to the values that the labels in the group can take. For example, for the tree 44 shown in FIG. 3, each node has 8 combinations of states, and thus the shared information of two nodes has 64 values.

Similarly, $\phi_g(x)=[\{s_i(x)\}_{\mathcal{G}_g}, 1]$ becomes the extended vector of SVM scores associated with the image labels in the group. The pairwise potential of Eq. (5), now links groups of k binary variables, and hence will be defined by $2^{2k}$ scalars. Therefore the cost of message passing algorithms scales with $O(G2^{2k})$. In order to reduce the risk of overfitting and to maintain tractable inference, the group sizes are chosen to be fairly small. In one embodiment, $k \leq 20$, in another embodiment, $k \leq 10$, and in one embodiment, $k \leq 4$. The maximum size for k may thus be dependent, to some degree, on the availability of training data.

3. Mixtures of Trees

In one embodiment, a mixture M of trees with different group sizes k can be considered. The models 42 are trained independently, and then the predictions of the individual models for a new image 16 are combined, e.g., averaged. Alternatively, each model is given a mixture weight and the predictions combined as a function of the mixture weights. The mixture weights can be learned concurrently while learning the trees, potentially improving results.

The prediction on labels y for an image x in the case of a mixture of trees 42 with different numbers of k labels per node can be defined as:

$$p(y|x) = \sum_{k=1}^{K} \pi_k p_k(y|x), \qquad (9)$$

where $\pi_k$ denote the mixing weights, and the $p_k(y|x)$ denote the models for different values of k. In the sum above, k=1 represents the first value of k and so forth, it is not necessary for there to be a tree for each possible group size from 1–K. In one embodiment, equal weights can be used, i.e., $\pi_k=1/K$.

The label marginals $p(y_i|x)$ can, in this case, be obtained as a "mixture of the marginals" computed in the component models. This can be seen from the following identities:

$$p(y_i|x) = \sum_{y \setminus i} p(y|x) \qquad (10)$$

$$= \sum_{y \setminus i} \sum_k \pi_k p_k(y|x)$$

$$= \sum_k \pi_k \sum_{y \setminus i} p_k(y|x)$$

$$= \sum_k \pi_k p_k(y_i|x)$$

In the first and last equations, the definition of the marginal probability is used, in the second, the definition of the mixture is used, and in the third the two sums are swapped.

While in the exemplary embodiments, only trees 44 over single labels or groups of labels are used, it is to be appreciated that the exemplary method can readily be extended to more general graph structures, provided that the tree-width of the graphical model is relatively low to ensure tractable inference. Similarly, the binary label case considered here can be readily extended to image labels taking one among three or more mutually exclusive values. In other embodiments, the models may be trained using max-margin methods (see, I. Tsochantaridis, T. Joachims, T. Hofmann, and Y. Altun, "Large margin methods for structured and interdependent output variables," JMLR, 6:1453-1484, 2005).

4. Attribute-based Image Classification

The exemplary structured models 42, in addition to being effective for image annotation, can be exploited in the context of attribute-based image classification.

In attribute-based image classification, an image 16 is assigned to a given class $z \in \{1, \ldots, C\}$ based on a set of attribute values. (See, for example, S. Branson, et al. "Visual recognition with humans in the loop," in ECCV, 2010; and C. Lampert, et al., "Learning to detect unseen object classes by between-class attribute transfer," in CVPR, 2009). Predicting the attribute values for an image corresponds to annotating an image with a set of labels as in the methods described above. In this case, the structured models are used at the attribute level. The user interaction, in the case of the interactive mode, also takes place at the attribute level. The system 10 asks for user input on the attribute level labels to improve the class predictions, rather than to improve the attribute prediction.

In one embodiment, an image belongs to exactly one class, but attributes are shared among different classes. For example, consider the case where images of animals are to be assigned to certain classes, such as cat, dog, elephant, or the like. Each of these classes can be associated with a group of attributes selected from a set of attributes. Such attributes, in the case of animals, may include has stripes, has paws, has fur, swims, etc. As will be appreciated, for a given image, not all attributes may be detectable, for example a cat is sitting on its paws so they are not visible in the image and the "paw" classifier may predict "no paws" for the paw attribute. The system thus predicts that the image is of a cat based on all the attribute predictions, some of which are inconclusive or negative, in the case of binary attribute labels.

Advantages of such a system are that it can recognize unseen classes based on an attribute-level description, and that the attribute representation can, in principle, encode an exponential number of classes. Additionally, by sharing the attributes among different classes, classifiers for each of the attributes can be learned by pooling examples of the different classes. This increases the number of training examples per classifier as compared to the number of examples available for the individual classes.

Here, the structured prediction model is applied at the level of attributes, i.e., the method learns a tree structured model over attributes (which are referred to as attribute "labels" for consistency with the above description) instead of image labels, and the binary values $y_i$ now refer to the presence or absence of an attribute for an image. It can be assumed that a deterministic mapping between attribute labels and the C object classes is given. The attribute configuration of a class c is denoted by $y_c$. $y_c$ can be expressed as a vector with one value for each attribute, such as a binary value or other scalar value. The distribution over image classes by the normalized likelihoods of the corresponding attribute configurations can be defined by:

$$p(z = c \mid x) = \frac{p(y_c \mid x)}{\sum_{c'=1}^{C} p(y_{c'} \mid x)} = \frac{\exp - E(y_c, x)}{\sum_{c'=1}^{C} \exp - E(y_{c'}, x)} \quad (11)$$

where $p(z=c|x)$ represents the probability that the class z of an image x is c, and $y_{c'}$ represents the set of attributes for a given class c' from C.

It may be noted that the evaluation of $p(z|x)$ does not require belief-propagation. It suffices to evaluate $E(y_c,x)$ for the C attribute configurations $y_c$, since the partition function $Z(x)$ cancels from the numerator and denominator.

a. Handling Rare Classes

When using the model as described above, it can be observed that some classes tend to be much more often predicted than others, and the prediction errors are mainly caused by assigning images to these over-predicted classes. As this also holds for the independent attribute prediction model, it may be assumed that the reason may be that some classes have rare (combinations of) attribute values. To overcome this, a correction term $u_c$ may be introduced for each class to ensure that all classes will be predicted equally often in the expectation. In this embodiment, the class prediction model of Eq. (11) can be redefined as:

$$p(z=c|x) \propto \exp(-E(y_c,x)-u_c), \quad (12)$$

and set the $u_c$ such that on the training data, $\Sigma_n p(z=c|x_n)=n_c$ for all classes, where $n_c$ is the number of images in class c. To find the values of $u_c$, a procedure similar to logistic regression training can be used. In the case of zero-shot learning, the test classes have not been seen among the training images, therefore the class counts $n_c$ are not available, and so in one embodiment, the method sets $n_c=N/C$.

For example, using the correction terms $u_c$ of Eq. (12), the class prediction model can be represented as:

$$p(z = c \mid x_n) = \frac{\exp(-E(y_c, x_n) - u_c)}{\sum_{c'} \exp(-E(y_{c'}, x_n) - u_{c'})} \quad (13)$$

$$= \frac{\exp(-E_{nc} - u_c)}{\sum_{c'} \exp(-E_{nc'} - u_{c'})}$$

To set the correction terms, logistic discriminant training can be used. If ground truth class labels for the training images, given by $z_n$ are available, optimization of the (concave) log-likelihood of correct classification can be performed as follows:

$$\mathcal{L} = \sum_n \ln p(z = z_n \mid x_n) \quad (14)$$

$$= \sum_n \left( -E_{nz_n} - u_{z_n} - \ln \sum_c \exp(-E_{nc} - u_c) \right)$$

$$= -\sum_n E_{nz_n} - \sum_n u_{z_n} - \sum_n \ln \sum_c \exp(-E_{nc} - u_c) \quad (15)$$

$$= \text{constant} - \sum_c n_c u_c - \sum_n \ln \sum_c \exp(-E_{nc} - u_c), \quad (16)$$

where $n_c = \Sigma_n [[z_n = c]]$ denotes the number of examples of class c. The partial derivative w.r.t. $u_c$ is obtained as:

$$\frac{\partial \mathcal{L}}{\partial u_c} = -n_c + \sum_n p(z = c \mid x_n). \quad (17)$$

It can be seen that both the log-likelihood and the partial derivative can be computed without access to the labels of the individual samples $z_n$. It suffices simply to know the label counts $n_c$. Furthermore, from Eq. (17), it can be seen that for the stationary point of $\mathcal{L}$, $\Sigma_n p(z=c|x_n)=n_c$.

Therefore, setting the correction terms so as to maximize Eq. (16) ensures that $\Sigma_n p(z=c|x_n)=n_c$, turn ensuring that (in the expectation) the test classes are predicted as often as they should.

b. Setting the Class Counts for Attribute Based Classification

In attribute-based classification, the training data 13 is typically only labeled at the attribute level, and thus there may be no access to the counts of the class labels on the training data. In this case, the class proportions can be set as uniform ($n_c=N/C$) so that the model will, in expectation, predict all classes equally often. In reality, the test classes are not equally represented, and therefore setting $u_c$ based on a uniform $n_c$ may not be optimal in principle. However, in experiments where $u_c$ is set to match the label count on the test set, only marginal further improvements in classification accuracy are observed. Calibrating the models using the (true or uniform) label counts $n_c$ can also be done using the test images 16, instead of the training images 13, leading to a transductive learning method. Again this has only a minor impact on classification accuracy. It may thus be concluded that it is helpful to set the correction terms so as to avoid grossly over or under predicting certain classes, but that it is less important to finely tune them using other than uniform counts $n_c$ or using the test images instead of the training images.

c. Correction Terms for Mixtures of Trees

To handle the correction terms when using a mixture M of tree-structured models, the class predictions made by the different models can be combined as:

$$p(z = c \mid x) = \sum_k \pi_k p_k(z = c \mid x), \quad (18)$$

where the $\pi_k$ are the mixing weights of the tree-structured models for different values of k (number of labels per node in the tree), and $p_k(z=c|x)$ is the class prediction obtained using a tree with node size k. Separate correction terms for each component model $p_k(z=c|x)$ are first learned, as described above. Doing so ensures that the mixture model is then also calibrated. This can be seen from the following equalities:

$$\sum_n p(z=c\mid x_n) = \sum_n \sum_k \pi_k p_k(z=c\mid x_n) \quad (19)$$
$$= \sum_k \pi_k \sum_n p_k(z=c\mid x_n)$$
$$= \sum_k \pi_k n_c$$
$$= n_c$$

In the first equality, the definition of the mixture is used, in the second the sum over n is pushed through the sum over k, in the third equality, the fact that the mixture components have been calibrated is used, and in the last equality, that the mixing weights sum to one.

5. Label Elicitation Strategies

When the system has information about one or more of the labels, this information can be used in predicting values of other labels. Table 1 illustrates the impact of the system 10 in the interactive mode on the example image shown in FIG. 4.

TABLE 1

| BEFORE | QUESTIONS | AFTER |
|---|---|---|
| 01 Sky | Building | 01 Rock |
| 02 Tree | Tree | 02 Rocks |
| 03 Building | Sea | 03 Sea |
| 04 Sea | Rocks | 04 Sky |
| 05 Rocks | Rock | 05 Sand |
| 06 Plant | | 06 Ground |
| 07 Ground | | 07 Plant |
| 08 Rock | | 08 Person |
| 09 Person | | 09 Window |
| 10 Window | | 10 Water |

The predicted order of labels 14, output by the classifier 40 alone, starting with the most probable are shown in the Before column in Table 1. The Questions column shows the five labels presented to the user as queries. Each subsequent query presented is dependent on the user's answer to the previous query and the structured model. The After column shows the re-ranked order of labels after all these queries were answered by the user. The ground truth for this image, in this case, the top five labels which would be manually applied, are shown in bold. As can be seen, the top five labels in the After column correspond to the ground truth. Although this is not always the case, the labels can be expected to match the ground truth better (assuming that the user is responding correctly to the queries). Significantly, one of these top five labels sand, is not among the top ten most probable labels before the questions were asked, nor is it among the queries. Rather, the label has been inferred, based on the user's answers, through operation of the structured model 42. Also, because the sky label is highly conditional on the sea and rock labels, the system has not selected to use sky in one of its five permitted queries, in this example.

An exemplary interactive image annotation method (S118-S128) will now be described. In the interactive mode, a user is iteratively asked to reveal the value of selected labels. While a random choice of these labels is also possible, and the system can take advantage of those values, in one embodiment, a label election strategy is employed whose aim is to minimize the uncertainty of the remaining image labels (or the class label) given the test image.

a. Label Elicitation for Image Annotation

In one embodiment, the object is to select the label $y_i$ for which, knowing its ground truth value, minimizes the uncertainty on the other labels. One way to achieve this is to minimize the entropy of the distribution on the label vector y, given the user input for one label $y_i$, by varying i, which indicates which label will be set by the user.

Let $y_i^l$ denote $y_i=1$, and $y_{\setminus i}$ denote all label variables except $y^i$. A user provides the value $y_i^l$. Then, given $y_i^l$, the uncertainty on other labels $y_{\setminus i}$ is quantified by the entropy:

$$H(y_{\setminus i}\mid y_i^l, x) = -\sum_{y_{\setminus i}} p(y_{\setminus i}\mid y_i^l, x)\ln p(y_{\setminus i}\mid y_i^l, x). \quad (20)$$

However, the value of $y_i$ is not known prior to the moment when it is selected by the user. Therefore, the exemplary method evaluates the expectation of Eq. (20), i.e., assumes that the user sets the next variable $y_i$ so that it minimizes the conditional entropy:

$$H(y_{\setminus i}\mid y_i, x) = \sum_l p(y_i=l\mid x)H(y_{\setminus i}\mid y_i=l, x) \quad (21)$$

Given the basic identity of conditional entropy (see, Bishop), then it can be seen that:

$$H(y\mid x)=H(y_i\mid x)+H(y_{\setminus i}\mid y_i,x) \quad (22)$$

and as H(y|x) does not depend on the selected variable $y_i$, it can be deduced that minimizing Eq. (21) for $y_i$ is equivalent to maximizing H($y_i$|x) over i. Hence, the label variable $y_i$ that has the maximum marginal entropy H($y_i$|x) is selected at S122.

To select a collection of labels to be set by the user, the method can proceed sequentially by first asking the user to set only one label. The procedure is then repeated, conditional on the labels already provided by the user. In another embodiment, more than one label, e.g., a group of labels, is set in one iteration, although this may be suboptimal as the method cannot leverage information contained in the user input in the selection procedure.

Rather than selecting images to be labeled at training time by a user to improve a classifier model, the present system operates in the interactive mode at test time. For a given image, the system selects labels for which user-input is most valuable in order to improve predictions on the values of other labels of the same image. Thus, for example, if the classifier has predicted that an image is likely to be labeled with water and sea and the tree shows there are highly correlated, then the system may need only to query one of these labels to have a good intuition of the other label, since boosting the prediction on water reduces the uncertainty on sea.

As will be appreciated, any preassigned label values may be treated in the same way as elicited label values. For example, the system selects the first label to be elicited from the user for the image 16 based on the preassigned labels, classifier scores for non-queried candidate labels, and the structured model.

b. Attribute Elicitation for Image Classification

The attributes are shared across image classes, and image classification proceeds by predicting the most likely attribute configuration that corresponds to one of the possible classes. Similar to the work of Branson (S. Branson, C. Wah, F. Schroff, B. Babenko, P. Welinder, P. Perona, and S. Belongie, "Visual recognition with humans in the loop," ECCV, 2010), user input at the level of attributes can be exploited, but in the present case, the recognition models are learned for attributes rather than for the object categories. This has the advantage that it allows for recognition of classes for which no training images are available, but only an attribute-based description is known. The dependencies between attribute labels are modeled by the tree. This allows not only an improvement in attribute-based recognition, but also in choosing the next attribute with which to query the user.

In the case of attribute-based image classification, the same strategy as described above may be used at the attribute level. However, since the final aim is to improve the class prediction, in the exemplary embodiment, an attribute elicitation criterion is used that is directed towards minimizing uncertainty on the class label, rather than uncertainty at the attribute level. The information obtained from a revealed attribute value thus depends on the agreement among the classes on this attribute. If some of the probable classes do not agree on the observed value, the method can then exclude those classes with a contradicting attribute value, and concentrate the probability mass on the compatible classes. Therefore, any informative question will at least rule out one of the possible classes, and thus at most C−1 attributes need to be set by the user for the class to be known with certainty. Of course, as with label elicitation, the aim is to limit the number of attributes elicited from the user, while ensuring an acceptable probability of correctly identifying the class.

To see which attribute should be set by the user, the conditional entropy $H(z|y_i,x)$ is minimized. In particular, using the identity:

$$H(z,y|x) = H(y_i|x) + H(z|y_i,x) + H(y_{\setminus i}|z,y_i,x) \quad (23)$$

It can be seen that: (i) the left-hand-side of the equation does not depend on the choice of attribute y, to elicit from the user; and (ii) the last term $H(y_{\setminus i}|z,y_i,x)$ equals zero, since for each class there is a unique setting of the attribute values. Therefore, selecting the attribute to minimize the remaining entropy on the class label is equivalent to selecting the attribute with the largest marginal entropy $H(y_i|x)$.

Note, that in the attribute-based classification model $p(y_i|x)$ differs from the image annotation model, since in this case, it is implicitly defined through Eq. (12), which essentially rules out all attribute configurations, except the ones that correspond to the C classes. Therefore, this gives:

$$p(y|x) = \sum_c p(z = c|x)[\![y = y_c]\!] \quad (24)$$

$$p(y_i|x) = \sum_{y_{\setminus i}} p(y|x) = \sum_c p(z = c|x)[\![y_i = y_{ic}]\!] \quad (25)$$

where $y_{ic}$ denotes the value of attribute i for class c. In particular, for binary attributes, this gives:

$$p(y_i = 1|x) = \sum_c p(z = c|x)y_{ic}, \quad (26)$$

As above, at S124, sequences of user queries are generated progressively, by conditioning on the image 16 and all the attribute labels 14 given so far to determine the next attribute to query.

The attribute elicitation mechanism for interactive attributed-based image classification need not be changed when using different variants of the model (using correction terms, using trees over groups of k attributes for various k, or mixtures of such models). In all cases a class prediction model $p(z=c|x)$ is obtained, which combined with the class specific label configuration $y_c$ is used to compute marginals over the attribute variables, $$p(y_i = 1|x) = \sum_c p(z = c|x)y_{ic}, \quad (27)$$

The label marginals are used to select the attribute to be set by the user.

6. Predicting Labels for the Image a. Computing Label Marginals

In S124, in one embodiment, the aim is to find the probability that a specific label is true for this image, i.e., $p(y_i=1|x)$ for label i. This label marginal can be used to rank images for a specific label, to sort labels for a specific image, and for label elicitation (to select the next label in S122).

Given a tree 44 and an image 16, a standard belief propagation algorithm can be used to compute the node marginals, i.e., the probability for each state of a node 46, 50, etc. in the tree. If a node in the tree has only a single label 14, the node marginal corresponds to the label marginal. For a node that groups together multiple labels, the label marginals from the node marginals are computed. The label marginal can then obtained by summing the right entries of the node marginal.

TABLE 2 shows an example of a compound variable that combines three image labels (k=3). The compound variable has $2^3=8$ states. The details for the state marginal probability and the corresponding configurations of the 3 labels are shown. The label marginals for the individual labels can be obtained by summing the marginal probabilities of the corresponding joint states. The results are taken from an example image of a sunset over an ocean which is largely blue sky with a few clouds.

TABLE 2

Extended models: grouping label variables and mixtures of trees

| State | Marginal | Landscape/Nature | Sky | Clouds |
|---|---|---|---|---|
| 1 | 3.4% | 0 | 0 | 0 |
| 2 | 0.00% | 0 | 0 | 1 |
| 3 | 9.8% | 0 | 1 | 0 |
| 4 | 59.9% | 0 | 1 | 1 |
| 5 | 0.4% | 1 | 0 | 0 |
| 6 | 0.0% | 1 | 0 | 1 |
| 7 | 2.6% | 1 | 1 | 0 |
| 8 | 23.9% | 1 | 1 | 1 |
| Marginal on label = true | | 26.9% | 96.2% | 83.8% |

The label marginals for all labels can then be used as the prediction that the label is true for a specific image, or the marginals can be ranked and the top labels can be selected as the predicted for the label(s) for the image.

In another embodiment, the most likely joint labeling state $y^* = \arg\max_y p(y|x)$ is found. This is done by a standard belief propagation technique, but slightly different than for the marginal state (see C. Bishop. Pattern recognition and machine learning. Spinger-Verlag, 2006). It is often called the Max-Product Algorithm or the Max-Sum Algorithm, which are generalizations of the Viterbi Algorithm for Hidden Markov Models.

In the case of attribute based class prediction, the label marginal is not of interest, and the joint likely state is given by the predicted class. Recall that there is a 1 to 1 mapping between the class c and a specific setting of which attributes are on and off: $y_c$. (See also Eqn. 11 above).

b. Interactive Case

As will be appreciated, when a user has assigned a label $y_i$ to the image x in the interactive mode at S118 (or there is a preassigned label value) the unary potential $\psi_i(y_i,x)$ for that label is no longer (solely) dependent on the classifier output, but on the user's label (or preassigned label value).

In order to compute the pairwise marginals when one or more labels have been set by a user or is preassigned, at S126, an additional unary term per node can be added, having a value which depends on the assigned label (user-assigned or preassigned). For a node in a tree with a single label, this is straightforward: zero energy can be assigned to the label value which has been set by the user (or preassigned), and infinite energy to the other value(s). (In other embodiments, the values are adjusted to account for the possibility that a user (or preassigned value) may be wrong, e.g., by assigning a small energy to the label value set by the user and a much higher energy to the other labels). For nodes with k>1 labels, zero energy is added to all joint-states that are compatible with the user input, and infinite energy to those that are not. In the example of TABLE 2, if a user has set Sky=true, this would incur infinite energy for states 1, 2, 5, and 6 of the 3-label node.

Experiments conducted using a prototype system using three public benchmark datasets demonstrate results that are comparable or better than existing methods and further, that even a relatively small amount of user input can substantially improve the results, in particular when models that capture dependencies among image labels are used.

In the case of attributes, experiments demonstrate that the structured models outperform independent attribute prediction, both in automatic and interactive scenarios, and that a small amount of user input on the attributes substantially improves the classification results.

The system and method have a variety of applications. Particular applications are assisted manual annotation and completely automatic categorization/annotation. In a classical categorization setup, the model(s) are learned from the training set and are used to annotate a set of unseen images. Given a database with manual annotations (e.g., Getty, Flickr) where in general some labels are available but the annotation is not complete, the system can complement the missing annotations in a more efficient way than independent classifiers by exploiting the relationship of existing labels with the ones which are to be predicted. Similarly, given a database annotated with a given vocabulary, and a goal is to add new annotations to it, the system can be used with fewer manually annotated images and used as training for the new annotations than for an independent system. Indeed, by annotating a subpart of the existent dataset the system not only to learns the new class models but also learns relationships between old and new labels. A multi-modal dataset, where user tags or text information is available with the images, can also benefit from the system and method. In the case of user tags, further dependencies can be learned between the set of desired labels and other available user tags. In one embodiment, where the test image has also some "textual information" from which some of the labels/tags can be deduced, these can act directly as "user input" in the interactive image annotation mode. The system can be used in attribute-based image classification, as discussed above.

Without intending to limit the scope of the exemplary embodiment, the following examples demonstrate implementations of the system and method.

5 EXAMPLES

A prototype system was implemented as described below and evaluated for automatic and interactive image annotation and attribute-based image classification.

a. Data Sets and Implementation Details

Three publically available data sets were used, as follows:

DATASET A: This used the ImageCLEF'10 data set as a training set. This dataset is a subset of the MIR-Flickr data set (see, M. Huiskes and M. Lew, "The MIR Flickr retrieval evaluation, in ACM MIR, 2008) used in the ImageCLEF Photo Annotation task in 2010 (see S. Nowak and M. Huiskes, "New strategies for image annotation: Overview of the photo annotation task at imageclef 2010," in Working Notes of CLEF, 2010). The images are labeled with 93 various image concepts (labels), as shown in the tree in FIG. 3. Besides the images, the Flickr-tags assigned to each image are also provided. As a feature vector, a concatenation of the improved Fisher vector representation computed over two channels (SIFT and color features) is used (see, F. Perronnin, J. Sánchez, and T. Mensink, "Improving the fisher kernel for large-scale image classification," in ECCV 2010). Alternatively a binary vector denoting the presence of the most common Flickr-tags is used. The data is divided into five folds, and the results reported below are the average over the folds. For sake of clarity, standard deviations are omitted. In practice, they are small as compared to the differences between prediction methods.

DATASET B: the SUN'09 data set was introduced to study the influence of contextual information on localization and classification (see M. Choi, J. Lim, A. Torralba, and A. Willsky, "Exploiting hierarchical context on a large database of object categories," in CVPR, 2010, "Choi 2010"). Results are compared to their classification results. The same image features as used for DATASET A are used. For both datasets, linear SVM classifiers are used.

DATASET C: Animals with Attributes. This dataset contains images in 50 animal classes, together with a definition of each class in terms of 85 shared attributes (see C. Lampert, H. Nickisch, and S. Harmeling, "Learning to detect unseen object classes by between-class attribute transfer," in CVPR, 2009). The provided features of Lampert 2009 are used, as well as the same sum of radial basis function (RBF)-$\chi^2$ kernels, regulation parameter C=10, and the same 40 training and 10 testing classes.

Table 3 provides some basic statistics on the datasets.

TABLE 3

Basic statistics of the three datasets

|  | DATASET A | DATASET B | DATASET C |
|---|---|---|---|
| No. of training images | 6400 | 4367 | 24295 |
| No. of test images | 1600 | 4317 | 6180 |
| No of Labels | 93 | 107 | 85 |
| Training images/label | 833 | 219 | 8812 |
| Training labels/image | 12.1 | 5.34 | 30.8 |
| Testing images/label | 205 | 213 | 676 |
| Testing labels/image | 12.1 | 5.3 | 32.0 |
| Number of parameters | | | |
| k = 1 | 740 | 852 | 676 |
| k = 2 | 1284 | 1480 | 1172 |
| k = 3 | 2912 | 3340 | 2644 |
| k = 4 | 7508 | 8640 | 6836 |

For DATASET A, numbers of the first fold only are reported. When using the independent prediction models, sigmoid functions are learned on the SVM scores. The independent predictions are the class predictions (from, e.g., an SVM) given an image, which are calculated independent from another class.

This allows a comparison with the outputs of the different classifiers, selection of labels for user input, and ranking of labels by confidence values for a given image. To learn the tree-structured models, or sigmoids for the independent models, a method similar to Platt scaling is used: the training set is split into five folds, and for each fold f SVMs are trained on the remaining folds, and the classification scores for fold f obtained. For test images, SVM scores obtained by training on all training images are used. These are used to train the probabilistic models. Platt scaling is discussed in J. Platt, "Probabilities for SV machines," in Advances in Large Margin Classifiers, 2000.

b. Fully-automatic Image Annotation

The influence of the structured models in the fully automatic prediction setting is evaluated. As evaluation measures, average precision (AP), which indicates the retrieval performance of a label over the dataset, and the mean of AP over all labels (MAP) are used. The AP of labels at the image level (iAP) is also considered. This is the average precision of the correct labels for each image and is a measure of performance of annotating a single image. An average of iAP over all images gives iMAP. This performance measure correlates with the number of corrections needed to obtain a completely correct image labeling.

FIGS. 6 and 7 show the performance in the fully automated prediction mode for MAP and iMAP. Results of the comparative independent model (I), the trees with group sizes $1 \leq k \leq 4$ (k1, k2, k3, k4), and the mixture of trees (M), are compared. It can be seen that most structured prediction models outperform the independent model, with improvements of >1% for MAP on DATASETS A and C and for iMAP on A and B. The mixture model generally performs best, or is comparable to the best performing model.

c. Interactive Image Annotation

In this setting, the user input is simulated by assigning the ground truth value to labels iteratively selected for user input using the entropy criterion detailed above. FIGS. 8 and 9 show the performance in interactive setting with 10 questions (1 label per question). As expected, the structured models benefit more from the user input than the comparative model, since they can propagate the information to update their belief of other labels. The mixture of trees performs best, or is comparable to the best model. The performances of the independent model, the tree models with $1 \leq k \leq 4$, and for the mixture of the tree models are given.

Figure 10:
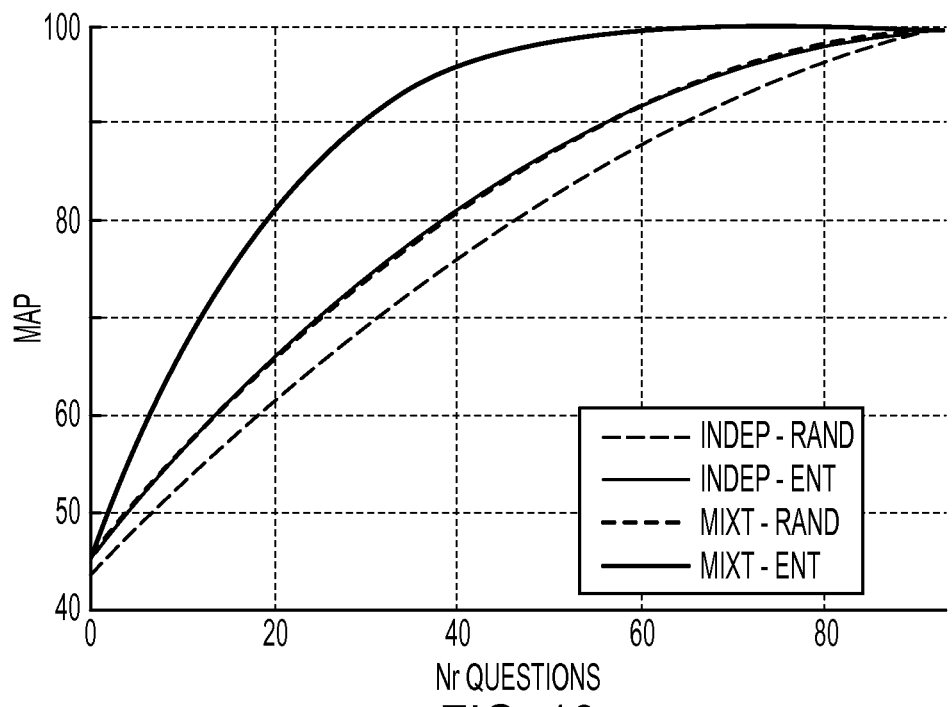
FIG. 10 illustrates the effect on MAP of number of questions asked in the fully automated and interactive modes for the present method and independent method.
Figure 11:
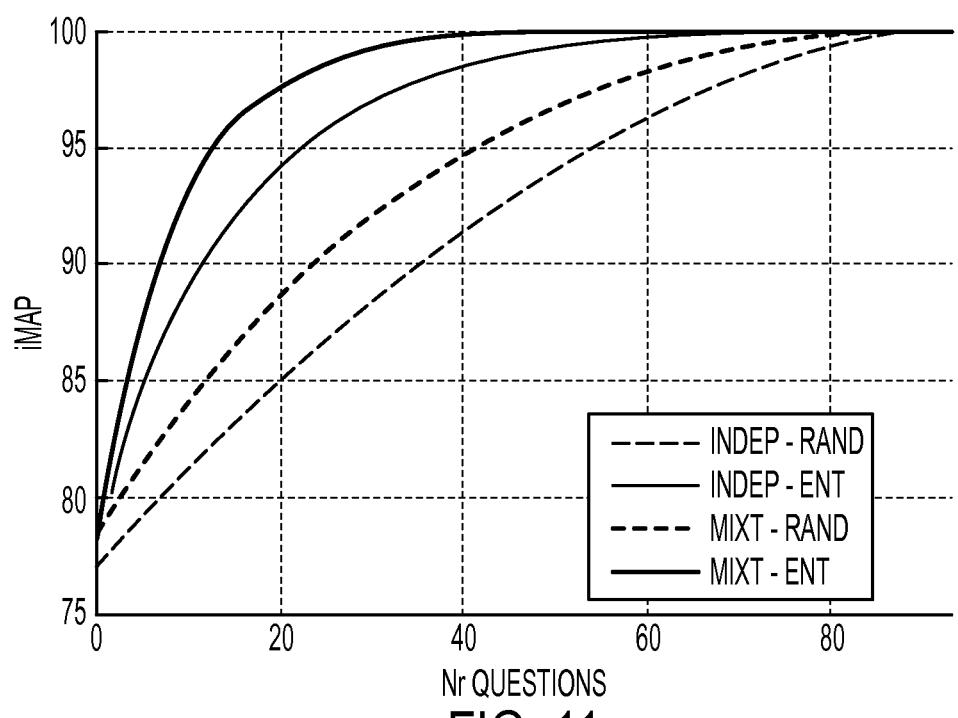
FIG. 11 illustrates the effect on iMAP of number of questions asked in the fully automated and interactive modes for the present method and independent method.

FIGS. 10 and 11 show the MAP and iMAP performance of the system on DATASET A for the independent class (label) predictors and the exemplary mixture model, varying from no user input (no questions) to complete user-input on all labels. Again the exemplary methods achieve perfect labeling after fewer steps than the independent predictors. To illustrate the benefit of the proposed entropy-based criteria, the labeling performance when randomly selecting labels for user input is also shown. Both the structured mixture model and the label elicitation mechanism help to improve performance.

Figure 12:
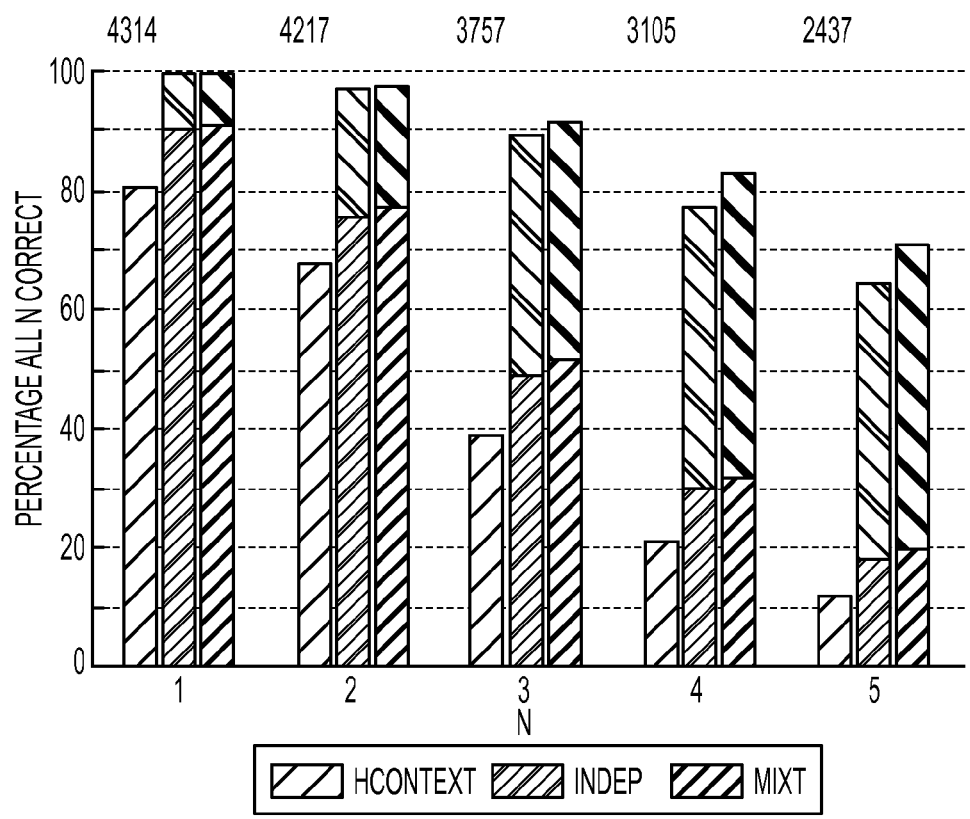
FIG. 12 illustrates the percentage of images where the first N images are correctly labeled for different values of N using the present method (mixture of trees) compared with two other methods.

FIG. 12 shows results for the present method and for the hierarchical method of Choi 2010, using the evaluation method proposed therein. The graph shows the percentage of images with at least N labels for which the top N predicted labels are all correct on DATASET B. The number of such images is listed at the top. The lower bars show the performance for automatic prediction, the bars on top show the improved performance after user input for 10 labels. The results show that the exemplary methods clearly outperform the hierarchical context model (HContext) of Choi, which also relies on object bounding boxes during training. While some improvement can be attributed to the use of Fisher vectors features instead of GIST, the differences between the independent class prediction method and structural methods become larger for more difficult images (larger N and after more user input).

Figure 13:
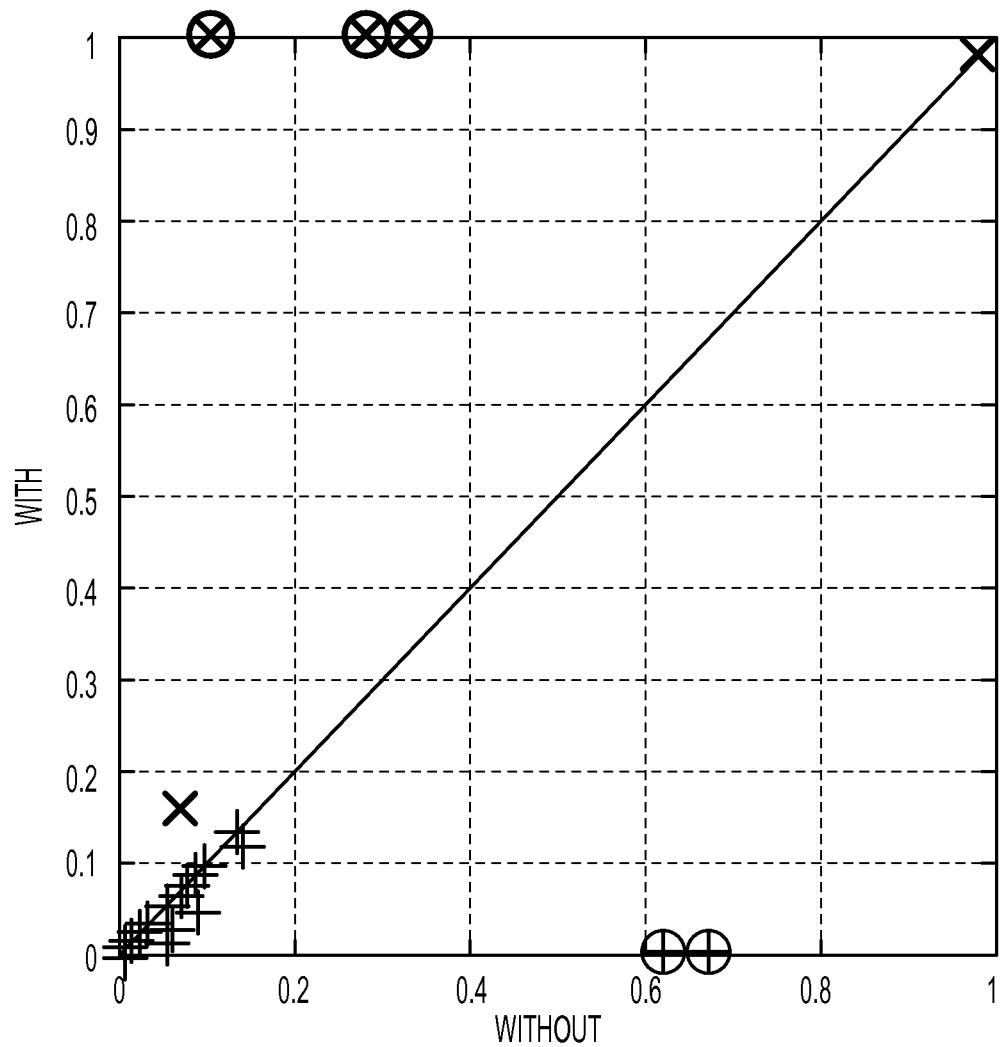
FIG. 13 illustrates labels for the image of FIG. 4 before and after applying the present method.

FIG. 13 illustrates label predictions for the image shown in FIG. 4 before and after the user inputs shown in TABLE 1. Labels are selected using the entropy criterion detailed above. The belief of each label prior the questions (horizontal) versus after the questions (vertical) is shown. Correct labels (according to the ground truth for the top five labels) are denoted with an x, asked labels are supplemented with a circle. It can be seen that the output of the classifier is significantly improved by the use of both the interactive mode and the structured model.

d. Attribute-based Prediction of Unseen Classes

The performance of the exemplary models in predicting class labels of images from unseen classes was evaluated on DATASET C, based on the class specific configuration of the 85 attributes. The present method was compared with the independent class prediction model, as discussed above. The same setting and the same measure (mean of the diagonal of the normalized confusion matrix) were used as in Lampert 2009. Table 4 shows the performance of the independent class prediction model and the exemplary mixture model, after asking up to eight questions.

TABLE 4

Zero-shot attribute-based classification accuracy of the independent and mixture of trees models: Initial results, and after user input for one to eight selected attributes

| | No. of Attributes | | | | | | | | |
|---|---|---|---|---|---|---|---|---|---|
| | Initial | 1 | 2 | 3 | 4 | 5 | 6 | 7 | 8 |
| Independent | 36.5 | 53.1 | 68.5 | 77.8 | 85.1 | 90.6 | 94.5 | 97.7 | 99.4 |
| Mixture of trees | 38.7 | 55.3 | 72.3 | 84.8 | 92.4 | 96.9 | 99.0 | 99.8 | 100.0 |

The above results show the percentage of images assigned to the right class. Note that the tree structured models learn attribute dependencies for the training classes which are different from the testing classes, i.e., during testing, combinations of attributes are seen which are never seen before. Even so, the exemplary models provide significant improvements over the results of the independent model. This is also reflected in the average number of attributes set by the user before the correct class is ranked first: 1.82±2.06 for the independent model, and 1.54±1.67 for the mixture of trees model.

As the above examples demonstrate, structured models for image annotation have been successfully applied in different application scenarios such as automatic and semi-automatic image annotation and attribute-based image classification. While these models offer moderate improvements over independent baseline models, they show substantial improvements in the interactive setting. In this case, where the system asks a user to set the value of a small number of labels, the exemplary models are able to propagate the user input to more accurate predictions on the other image labels. A similar trend of stronger improvement with more user input is also observed in the case of attribute-based image classification.

For all databases there is a significant performance improvement of the structured models compared to the independent model. The two data sets with the most structured labels, i.e., the AwA where each image of a class gets all attributes of that class, and ImageCLEF where some multiple-exclusive labels are present (e.g., winter, summer, autumn, spring, or no-visual-season), benefit most from the structured models.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. An annotation system comprising:
   memory which stores:
   a structured prediction model comprising a graphical structure which represents predicted correlations between values assumed by labels in a set of labels, the graphical structure comprising at least one tree structure, wherein in at least one of the tree structures, each of the labels in the set of labels is in exactly one node of the tree structure, the nodes of the tree having at most a predefined number k of the labels, and each of a plurality of the nodes has more than one of the labels, and edges between the nodes define those pairs of nodes for which predicted correlations between the values of pairs of their labels is used in the label prediction;
   memory which stores instructions for:
   generating feature-based predictions for values of labels in the set of labels based on features extracted from an image; and
   predicting a value for at least one label from the set of labels for the image based on the feature-based label predictions, and the structured prediction model, and, when the instructions include instructions for receiving an assigned value for at least one label from the set of labels for the image, the predicted value being also based on an assigned value for at least one other label, if one has been assigned; and
   a processor for executing the instructions.

2. The system of claim 1, wherein the predicted correlations comprise pairwise potentials between label pairs, each pairwise potential representing a probability that a first label in the label pair which is on a first node connected by an edge to a second node has a given value from a set of values when a second label in the label pair which is on the second node has a given value from a set of values.

3. The system of claim 1, wherein the predefined maximum number k is at least 2 and is less than a total number of the labels.

4. The system of claim 1, wherein the at least one tree structure comprises a plurality of tree structures and the prediction is based on a weighted combination of the tree structures, each of the tree structures having a different predefined number k of labels.

5. The system of claim 1, wherein the labels are attribute labels and the system includes instructions for predicting a class of the image based on the predicted attribute label values.

6. An annotation system comprising:
   memory which stores:
   a structured prediction model which represents predicted correlations between values assumed by labels in a set of labels, the structured prediction model comprises at least one tree structure and wherein in at least one of the tree structures, each of the labels in the set of labels is in exactly one node of the tree and edges between the nodes define those pairs of nodes for which predicted correlations between the values of pairs of their labels is used in the label prediction;
   memory which stores instructions for:
   generating feature-based predictions for values of labels in the set of labels based on features extracted from an image;
   providing for receiving an assigned value for at least one label from the set of labels for the image, and
   predicting a value for at least one label from the set of labels for the image based on the feature-based label predictions, and the structured prediction model, the predicted value being also based on an assigned value for at least one other label, if one has been assigned, the system having a mode in which for an input image to be labeled, a plurality of the label values for the image are elicited from a user, and wherein the instructions for predicting the value for the at least one label for the input image are based on predictions using features extracted from the image which are modified by the predicted correlations of the tree structure which propagates modified predictions on values of the labels provided by the user to other labels via the edges; and
   a processor for executing the instructions.

7. The system of claim 6, wherein a selection of at least one subsequent one of the plurality of label values to be elicited from a user is conditional on at least one previous one of the plurality of label values elicited from the user and the predicted correlations of the tree structure.

8. The system of claim 7, wherein the selection of the at least one subsequent one of the plurality of label values includes selecting a label based on maximizing entropy computed over all the other labels or selecting a label which has a maximum computed marginal entropy.

9. The system of claim 1, wherein in every tree structure, each node has no more than one parent node and at least one of the nodes with a parent node has at least one child node.

10. The system of claim 1, wherein the instructions for receiving an assigned value for at least one label from the set of labels for the image comprises instructions for receiving at least one of:
    an elicited label value; and
    a preassigned label value.

11. The system of claim 1, further including a classifier which generates the predictions using features extracted from the image that are modified by the predictive correlations of the graphical structure.

12. The system of claim 1, wherein the system includes instructions for generating the graphical structure based on a training set of labeled images by a generative method which computes an optimal maximum spanning tree over a fully connected graph over the labels using mutual information on pairs of the labels estimated from the training set.

13. A method for labeling images comprising:
    providing a structured prediction model in memory which represents predictive correlations between labels in a set of labels, the structured prediction model comprising a tree structure in which each of the labels in the set of labels is in exactly one node of the tree structure and edges between the nodes define pairs of nodes for which predicted correlations between values of pairs of labels is stored, the prediction of the value for the at least one label value being based on the predicted correlations;
    receiving an image to be labeled;

eliciting a plurality of the label values for the image from a user;

generating feature-based predictions for values of labels in the set of labels based on features extracted from the image; and with a processor, predicting a value for at least one label from the set of labels for the image based on the feature-based label predictions and predictive correlations of the structured prediction model, and based on an assigned label value for at least one other label, the assigned label value comprising the elicited label values, the prediction of the value for the at least one label for the input image including modifying at least one of the predicted correlations between values of the node which includes the label whose value has been elicited and at least those nodes linked by edges to that node based on the elicited value.

14. The method of claim 13, further comprising computing the tree structure using a generative model.

15. The method of claim 13, wherein in the tree structure, nodes of the tree have at most a predefined number k of labels, and wherein a plurality of the nodes have more than one label.

16. The method of claim 15, wherein the structured prediction model comprises a plurality of tree structures and the prediction comprises computing an optionally weighted combination of the predictions of the tree structures, each of the tree structures having a different predefined maximum number k of labels for its nodes.

17. The method of claim 13, wherein the method includes selecting at least one subsequent one of the plurality of label values to be elicited from a user conditional on at least one previous one of the plurality of label values elicited from the user and the predictive correlations of the structured prediction model.

18. The method of claim 13, wherein the labels are attribute labels and the method further includes predicting a class of the image based on the predicted attribute label values.

19. The method of claim 13, further comprising generating the feature-based predictions based on features extracted from the image with a classifier.

20. The method of claim 13, wherein the method comprises generating the structured prediction model based on a training set of labeled images by a generative method which computes an optimal maximum spanning tree over a fully connected graph over the labels using mutual information on pairs of the labels estimated from the training set.

21. The method of claim 20, further comprising computing parameters of node potentials and of edge potentials of the tree-structured conditional model using log-likelihood maximization using the independent label predictors.

22. The method of claim 13, wherein the predicting of the value for at least one label from the set of labels comprises using inference on the tree structure to find a most likely joint labeling for the structured prediction model.

23. A system comprising memory which stores instructions for performing the method of claim 13 and a processor in communication with the memory for executing the instructions.

24. A computer program product comprising a non-transitory recording medium storing instructions which, when executed by a computer, perform the method of claim 13.

25. A method for generating the annotation system of claim 1, comprising:

receiving a training set of manually-labeled training images;

for each of the training images, for each of a set of labels, generating a feature function based on features extracted from the image which predicts a value of the label for the image;

estimating mutual information between pairs of labels in a set of labels based on the training images;

optionally, clustering the set of labels into groups having at most a predetermined number k of labels; and with a processor, based on the mutual information and feature functions, generating the structured prediction model represented by a tree structure in which nodes of the tree structure include a respective single one of the labels or group of the labels, the nodes being linked by edges, each edge representing predicted correlations between values of labels in the pair of nodes connected by the edge, whereby when an image to be labeled is received, the tree structure allows predictions on labels to be informed by the predicted correlations in the tree structure.

26. The system of claim 3, wherein the predefined maximum number k is up to 10.

27. The system of claim 26, wherein the total number of the labels is at least fifty.

* * * * *